United States Patent Office 2,838,492
Patented June 10, 1958

2,838,492

6-FLUORO STEROIDS

Raymond L. Pederson and Milton E. Herr, Kalamazoo, John C. Babcock, Portage Township, Kalamazoo County, and J Allan Campbell and John A. Hogg, Kalamazoo, Mich., assignors to The Upjohn Company, Kalamazoo, Mich., a corporation of Michigan No Drawing. Application February 19, 1958
Serial No. 716,026

38 Claims. (Cl. 260—239.5)

The present invention relates to new steroids and is more particularly concerned with 6α- and 6β-fluorinated testosterones and the 17-acylates thereof, for example, 6-fluoro-17β-hydroxy-4-androsten-3-ones (6-fluorotestosterones), 6-fluoro-17β-hydroxy-19-nor-4-androsten-3-ones (6-fluoro-19-nortestosterones), 6-fluoro-17β-hydroxy-4-androstene-3,11-diones (6-fluoro-11-ketotestosterones), 6-fluoro - 17β - hydroxy - 19 - nor - 4 - androstene - 3,11-diones (6-fluoro-11-keto-19-nortestosterones), 6-fluoro-11β,17β-dihydroxy-4-androsten-3-ones (6-fluoro-11β-hydroxytestosterones), 6-fluoro-11β,17β-dihydroxy-19-nor-4-androsten-3-ones (6-fluoro-11β-hydroxy-19-nortestosterones), the 17-acylates thereof, 6-fluoro-4-antrostene-3,17-diones, 6-fluoro-19-nor-4-androstene-3,17-diones, 6-fluoro-11β - hydroxy - 4 - androstene - 3,17 - diones, 6 - fluoro-11β-hydroxy-19-nor-4-androstene-3,17-diones, 6-fluoro-4-androstene-3,11,17-triones, 6-fluoro-19-nor-4-androstene-3,11,17-triones and novel steroid intermediates used in the preparation thereof.

The novel compounds of this invention can be represented by the formula:

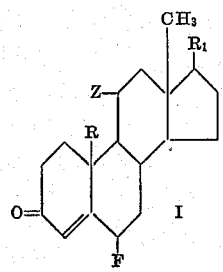

wherein R represents methyl or hydrogen, R₁ represents hydroxyl, OAcyl or ketonic oxygen and Z represents hydrogen, hydroxyl or ketonic oxygen. The term Acyl as used herein refers to an acyl radical of an organic carboxylic acid, preferably a hydrocarbon carboxylic acid, containing from one to twelve carbon atoms, inclusive.

It is an object of the present invention to provide novel 6-fluoro-17β-hydroxy-4-androsten-3-ones, 6-fluoro-17β-hydroxy - 4 - androstene - 3,11 - diones, 6 - fluoro - 11β,17β-dihydroxy-4-androsten-3-ones, their corresponding 19-nor compounds and the 17-acylates thereof, 6-fluoro-4-androstene-3,17-diones, 6-fluoro-11β-hydroxy-4-androstene-3,17-diones, 6-fluoro-4-androstene-3,11,17-triones, their corresponding 19-nor compounds, and novel steroid intermediates used in the preparation thereof and novel processes for the preparation thereof. Other objects will be apparent to those skilled in the art to which this invention pertains.

The 6-fluoro-17β-hydroxy-4-androsten-3-ones, 6-fluoro-17β-hydroxy-4-androstene-3,11-diones, 6-fluoro-11β,17β-dihydroxy-4-androsten-3-ones, their corresponding 19-nor compounds and the 17-acylates thereof, 6-fluoro-4-androstene-3,17-diones, 6-fluoro-11β-hydroxy-4-androstene-3,17-diones, 6-fluoro-4-androstene-3,11,17-triones and their corresponding 19-nor compounds, represented by Formula I, are useful as starting materials for the production of other compounds, represented by Formulas II, III, and IV, according to the following equations:

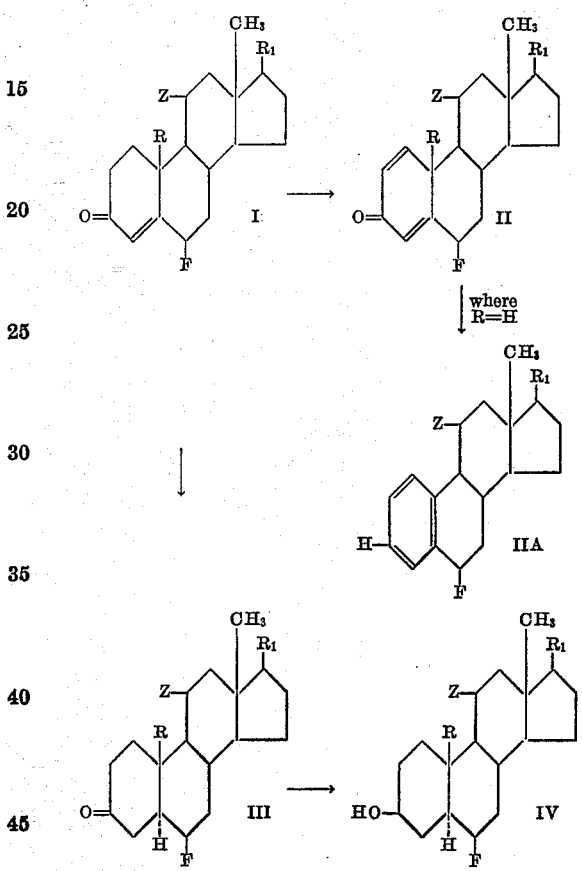

wherein R, R₁ and Z have the same meaning as given above.

The compounds represented by Formula II, for example, the 6-fluoro-17β-hydroxy-1,4-androstadien-3-ones and 6-fluoro-17β-hydroxy-19-nor-1,4-androstadien-3-ones can be obtained by dehydrogenation of the corresponding starting compound of Formula I. However, those compounds of Formula II where R equals hydrogen, for example, 6-fluoro-17β-hydroxy-19-nor-1,4-androstadien-3-ones, are unstable and spontaneously rearrange to produce the compounds of Formula IIA, for example, 6-fluoro - 19 - nor - 1,3,5(10) - androstatriene - 3,17β - diols [6 - fluoro - 1,3,5(10) - estratriene - 3,17β - diols]. The compounds of Formula IIA possess estrogenic, antiosteoporotic, anti-inflammatory and CNS regulating properties and find use in the treatment of acne. The dehydrogenation can be carried out chemically using selenium dioxide according to methods generally known for 1-dehydrogenating hydrocortisone or biologically using a fungus, for example, *Septomyxa affinis* A. T. C. C. 6737, in accordance with the procedure disclosed in Belgian Patent No. 545,877.

The conversion of the compounds of Formula I to the compounds of Formula III, for example, the 6-fluoro-17β-hydroxyandrostan-3-ones and 6-fluoro-17β-hydroxy-19-nor-androstan-3-ones is accomplished by catalytic hydrogenation of the corresponding starting compound of Formula I using a noble metal, preferably palladium, as catalyst. The reaction can be carried out at atmospheric or lower pressures and in the presence of an organic solvent, such as ethyl acetate. The thus-obtained compounds of Formula III can then be treated with a metal hydride, for example, lithium aluminum hydride or a metal borohydride, preferably an alkali-metal borohydride, such as sodium borohydride, in the presence of an organic solvent, such as dioxane, at room temperature, to produce the compounds of Formula IV, such as 6-fluoro-3β,17β-dihydroxandrostanes and 6-fluoro-3β,17β-dihydroxy-19-norandrostanes.

The novel products of this invention, the compounds of Formula I, possess therapeutic properties. The compounds of Formula I demonstrate anabolic and androgenic activity. For example, 6α-fluoro-17β-hydroxy-4-androsten-3-one 17-propionate (6α-fluorotestosterone propionate) exhibits essentially the same anabolic activity but only 33 percent of the androgenic potency of 17β-hydroxy-4-androsten-3-one 17-propionate (testosterone propionate). Thus, the 6α-fluoro substituted compound produces a three-fold increase in therapeutic ratio and is a potent preferentially anabolic compound. The compounds of Formulas II, III, and IV also possess androgenic and anabolic activity. Moreover, the compounds of Formulas I, II, III, and IV also possess antiestrogenic, antiosteoporotic and CNS regulating properties. Administration of the steroids of Formulas I, II, III, and IV can be in conventional dosage forms, such as pills, tablets, capsules, syrups or elixirs for oral use, or in liquid forms which are adaptable to the natural and synthetic steroid hormones for injectable products.

The novel steroids of Formula I can be prepared according to the following reaction sequence:

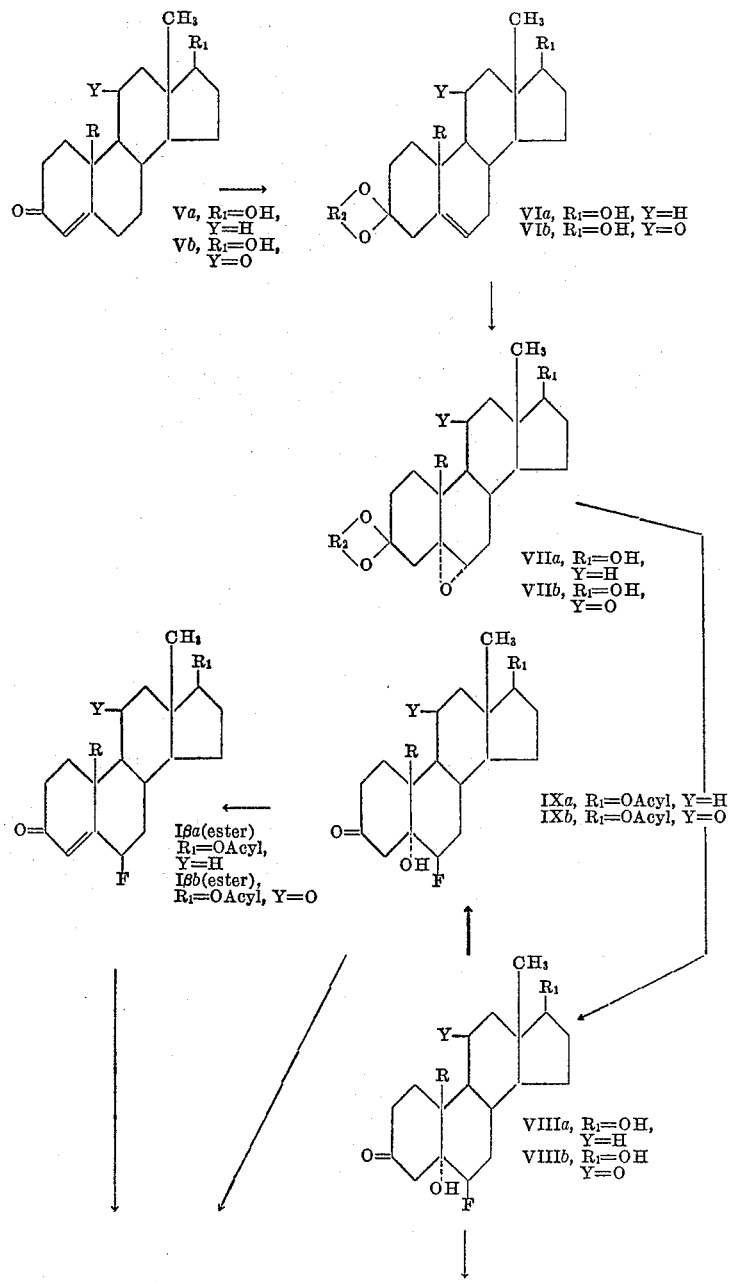

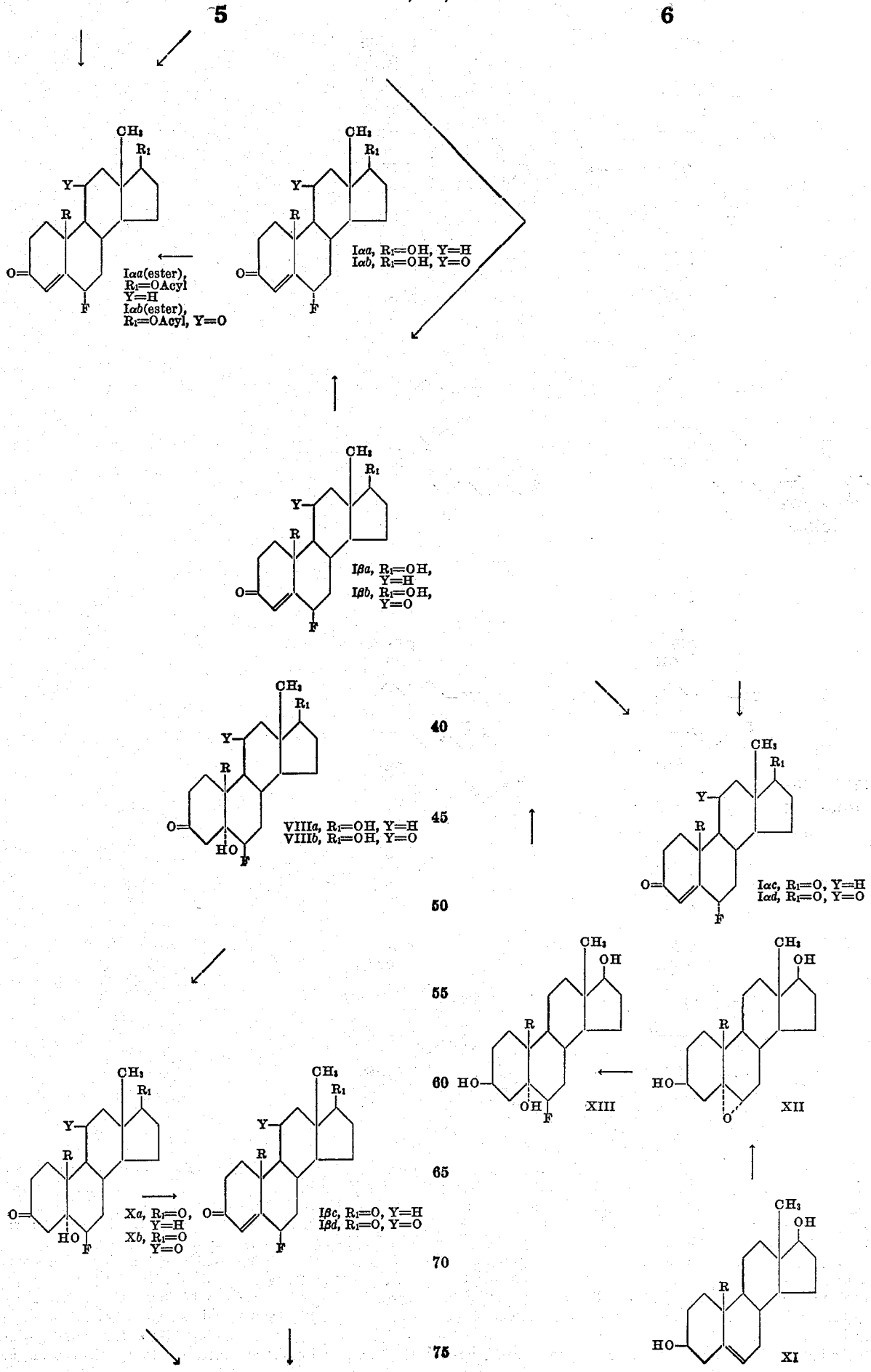

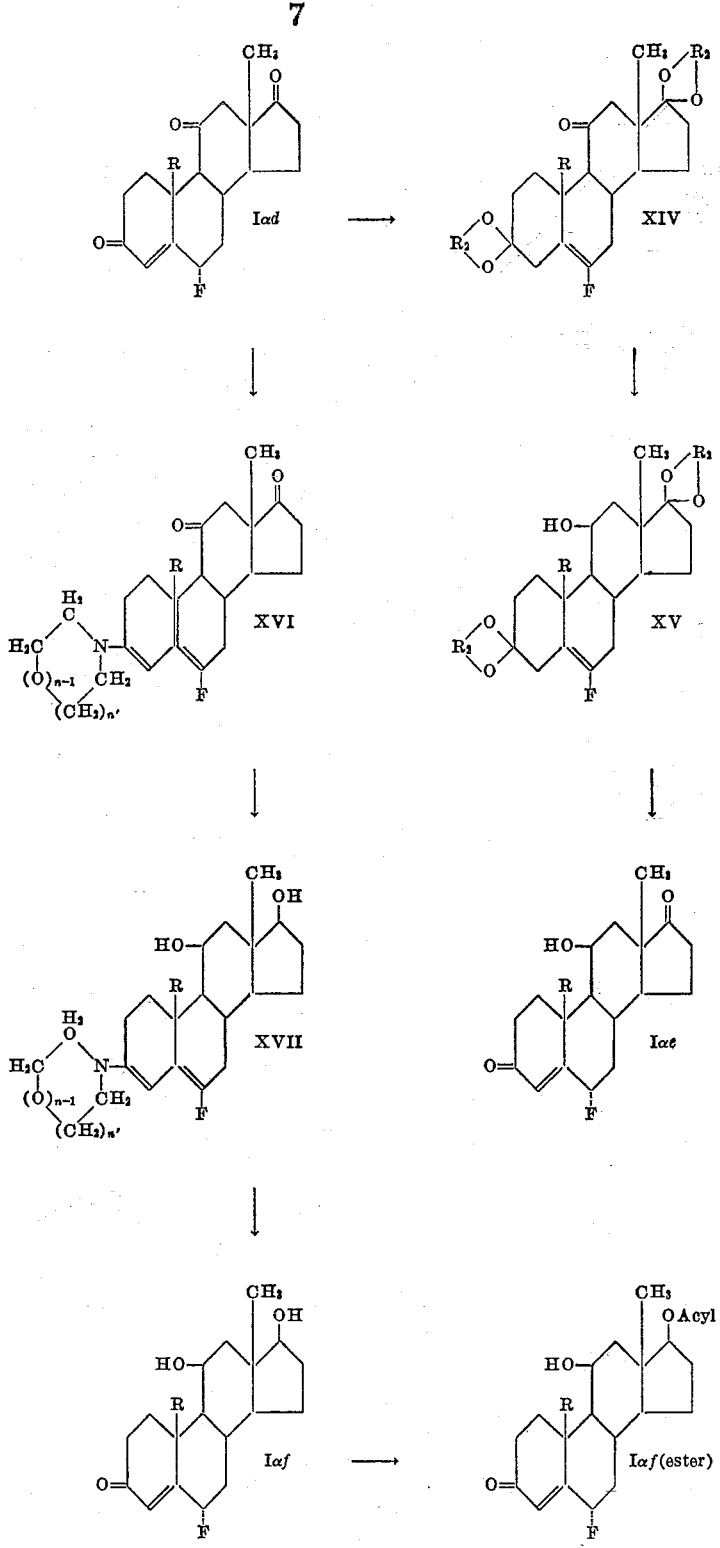

wherein R and $R_1$ have the same meaning as previously given, $R_2$ is an alkylene radical containing not more than eight carbon atoms, inclusive, and the attaching oxygen to carbon bonds are separated by a chain of at least two and not more than three carbon atoms, and Acyl is the acyl radical of an organic carboxylic acid, preferably a hydrocarbon carboxylic acid, containing from one to twelve carbon atoms, inclusive, Y is hydrogen or ketonic oxygen and $n$ and $n'$ are whole numbers from one to two, inclusive.

As indicated above and described in greater detail below, the reactions embodied in the processes characterizing this invention are susceptible of variation in the specific steps leading to the products of this invention, the precise sequence selected being determined by such factors as economics and convenience.

One of the processes of the present invention comprises treating compounds of the type represented by Formulae V$a$ and V$b$ such as 17$\beta$-hydroxy-4-androsten-3-one and 17$\beta$-hydroxy-4-androstene-3,11-dione, respectively, and their corresponding 19-nor compounds, with ethylene glycol in the presence of a strong acid as catalyst, such as toluenesulfonic acid, ortho-chlorobenzenesulfonic acid, sulfuric acid, and the like, to obtain the corresponding 3-ethylene ketals represented by Formulae VIa and VIb such as 17β-hydroxy-5-androsten-3-one 3-ethylene ketal and 17β-hydroxy-5-androstene-3,11-dione 3-ethylene ketal, respectively, and their corresponding 19-nor compounds. Similarly the compounds of Formulae Va and Vb can be reacted with other 1,2-alkane diols or 1,3-alkane diols such as propylene glycol, butane-1,2-diol, butane-1,3-diol, pentane-1,2- and 1,3-diol, hexane-1,2- and 1,3-diol, heptane-1,2- and 1,3-diol, octane-1,2- and 1,3-diol, or other alkane diols of the formula:

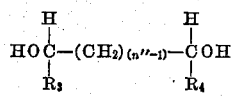

wherein $n''$ is an integrer having a value of from one to two, inclusive, and $R_3$ and $R_4$ are selected from the group consisting of hydrogen and lower alkyl radicals containing up to six carbon atoms, and wherein the total number of carbon atoms in the alkane diol is up to and including eight carbon atoms, to obtain the corresponding 3-alkylene ketals of the compounds of Formulae Va and Vb.

The compounds of Formulae VIa and VIb are then treated with a peracid such as peracetic acid or perbenzoic acid to obtain the corresponding 5,6-epoxy compounds represented by Formulae VIIa and VIIb, such as 5α,6α-epoxy-17β-hydroxyandrostan-3-one 3-ethylene ketal and 5α,6α-epoxy-17β-hydroxyandrostane-3,11-dione 3-ethylene ketal, respectively, and their corresponding 19-nor compounds.

The thus-obtained compounds of Formulae VIIa and VIIb, are then treated with a fluorine releasing agent such as hydrofluoric acid, preferably in the presence of an organic solvent, such as methylene chloride, to obtain the compounds of Formulae VIIIa and VIIIb, such as 6β-fluoro-5α,17β-dihydroxyandrostan-3-one and 6β-fluoro-5α,17β-dihydroxyandrostane-3,11-dione, respectively, and their corresponding 19-nor compounds.

The compounds of Formulae VIIIa and VIIIb are then subjected to treatment with an esterifying agent to obtain the 17-acylates represented by Formulae IXa and IXb, such as the 6β-fluoro-5α,17β-dihydroxyandrostan-3-one 17-acylates and 6β-fluoro-5α,17β-dihydroxyandrostan-3,11-dione 17-acylates, respectively, and their corresponding 19-nor compounds. Suitable esterifying agents are organic carboxylic acids, particularly hydrocarbon carboxylic acids, containing from one to twelve carbon atoms, inclusive, or the acid anhydrides and acid halides thereof. For example, a saturated straight-chain aliphatic acid, e. g., formic, acetic, propionic, butyric, valeric, hexanoic, lauric, a saturated branched-chain aliphatic acid, e. g., trimethylacetic, isobutyric, isovaleric, tertiary butylacetic, a cycloaliphatic saturated acid, e. g., β-cyclopentylpropionic, cyclohexane-carboxylic, cyclohexylacetic, an alkaryl acid, e. g., benzoic, phenylacetic, β-phenylpropionic, o-, m-, and p-toluic, a saturated dibasic acid (which can be converted into water-soluble, e. g., sodium, salts), e. g., succinic, adipic; a monobasic unsaturated acid, e. g., acrylic, crotonic, undecylenic, propiolic, undecolic, cinnamic; dibasic unsaturated acids (which can be converted into water-soluble, e. g., sodium, salts), e. g., maleic and citraconic, or the acid anhydrides and acid halides thereof, can be used to esterify the compounds of Formulae VIIIa and VIIIb to convert them into the compounds of Formulae IXa and IXb. If the esterifying agent is the free acid, the reaction is preferably effected in the presence of an esterification catalyst, for example, p-toluenesulfonyl chloride, trifluoroacetic anhydride, p-toluenesulfonic acid, trifluoroacetic acid, sulfuric acid, and the like.

The compounds of Formulae IXa and IXb are then dehydrated, preferably with a halo amide or imide of an aliphatic acid, such as N-bromoacetamide, N-chlorosuccinimide, or N-bromosuccinimide, dissolved in pyridine, dioxane, or other suitable solvents and in the presence of an anhydrous form of sulfur dioxide to produce the compounds of Formulae Iβa(ester) and Iβb(ester) such as 6β-fluoro-17β-hydroxy-4-androsten-3-one 17-acylates and 6β-fluoro-17β-hydroxy-4-androstene-3,11-dione 17-acylates, respectively, and their corresponding 19-nor compounds. The anhydrous sulfur dioxide can be in the form of gaseous or liquid sulfur dioxide or in the form of a material which, in situ, produces sulfur dioxide, as, for example, an alkali-metal hyposulfite.

The dehydration of the compounds of Formulae IXa and IXb can also be effected in alkali solution or in acidic solution. Suitable acid dehydrating agents include mineral acids, such as, for example, hydrochloric acid and sulfuric acid. Acetic anhydride, acetic acid, p-toluenesulfonic acid, or thionyl chloride in pyridine are also suitable as dehydrating agents. Basic dehydrating agents include, for example, alkali and alkaline earth metal hydroxides such as sodium, potassium, barium, and calcium hydroxides, and the like.

The compounds of Formulae Iβa(ester) or Iβb(ester), are then isomerized to the corresponding 6α-fluoro compounds of Formulae Iαa(ester) or Iαb(ester), such as 6α-fluoro-17β-hydroxy-4-androsten-3-one 17-acylates or 6α-fluoro-17β-hydroxy-4-androstene-3,11-dione 17-acylates, respectively, and their corresponding 19-nor compounds, by treating the Iβa(ester) or Iβb(ester) compounds at temperatures of zero degrees centigrade or slightly lower in a liquid medium, such as an organic solvent, for example, chloroform, methylene chloride, ether, and the like, and in the presence of prototropic agents (proton donating agents) such as water, alcohols, organic acids, and the like, with a mineral acid, such as hydrogen chloride. The reaction mixture obtained can then be washed with water and concentrated to give a residue containing Iαa(ester) or Iαb(ester).

Alternatively, the compounds of Formulae Iαa(ester) and Iαb(ester) are produced directly from the compounds of Formulae IXa and IXb, respectively, by treating the latter compounds at temperatures of zero degrees centigrade or slightly lower in a liquid medium, such as an organic solvent, for example, chloroform, methylene chloride, ether, and the like, and in the presence of prototropic agents (proton donating agents) such as water, alcohols, organic acids, and the like, with a mineral acid, such as hydrogen chloride. The reaction mixture can then be washed with successive portions of water and dilute alkali, such as sodium bicarbonate, followed by recovery of the compounds of Formulae Iαa(ester) and Iαb(ester) by conventional means, such as crystallization, chromatography, or both.

Alternatively, the compounds of Formulae Iαa(ester) and Iαb(ester) are obtained by dehydrating the compounds of Formulae VIIIa and VIIIb, to the compounds of Formulae Iβa and Iβb, such as 6β-fluoro-17β-hydroxy-4-androsten-3-one and 6β-fluoro-17β-hydroxy-4-androstene-3,11-dione, respectively, and their corresponding 19-nor compounds. The dehydration of the compounds Formulae VIIIa and VIIIb is effected in alkali solution or in acidic solution. Suitable acid dehydrating agents include mineral acids, such as, for example, hydrochloric acid and sulfuric acid. Phosphoric acid, acetic acid, p-toluenesulfonic acid, or thionyl chloride in pyridine are also suitable as dehydrating agents. Basic dehydrating agents include, for example, alkali metal and alkaline earth metal hydroxides such as sodium, potassium, barium, and calcium hydroxides, and the like. The thus-obtained compounds of Formulae Iβa and Iβb are then isomerized to the compounds of Formulae Iαa and Iαb, such as 6α-fluoro-17β-hydroxy-4-androsten-3-one and 6α-fluoro-17β- hydroxy-4-androstene-3,11-dione, respectively, and their corresponding 19-nor compounds, in the same manner used to isomerize the compounds of Formulae Iβa(ester) and Iβb(ester) to the compounds of Formulae Iαa(ester) and Iαb(ester), respectively, and esterifying the compounds of Formulae Iαa and Iαb to the compounds of Formulae Iαa(ester) and Iαb(ester). Suitable esterifying agents are those named above in connection with esterifying the compounds of Formulae VIIIa and VIIIb to the compounds of Formulae IXa and IXb.

The compounds of Formulae VIIIa and VIIIb can also be subjected to a simultaneous dehydration and isomerization treatment to produce the compounds of Formulae Iαa and Iαb in the same manner disclosed above for the conversion of the compounds of Formulae IXa and IXb to the compounds of Formulae Iαa(ester) and Iαb(ester).

The compounds of Formulae Iαc and Iαd, such as 6α-fluoro-4-androstene-3,17-dione and 6α-fluoro-4-androstene-3,11,17-trione, respectively, and their corresponding 19-nor compounds, are produced as follows: the compounds of Formulae VIIIa and VIIIb are oxidized, preferably in acetic acid solution, with an oxidizing agent, such as chromic anhydride or sodium dichromate, using a slight excess of the oxidizing agent. At the conclusion of the desired oxidation reaction, the chromic acid oxidant is generally destroyed by addition of methyl alcohol, ethyl alcohol, and the like, and the compounds of Formulae Xa and Xb, such as 6β-fluoro-5α-hydroxyandrostane-3,17-dione and 6β-fluoro-5α-hydroxyandrostane-3,11,17-trione, respectively, and their corresponding 19-nor compounds, can be recovered from the reaction mixture by conventional means. The compounds of Formulae Xa and Xb are then dehydrated to produce the compounds of Formulae Iβc and Iβd, such as 6β-fluoro-4-androstene-3,17-dione and 6β-fluoro-4-androstene-3,11,17-trione, respectively, and their corresponding 19-nor compounds, in the same manner used to dehydrate the compounds of Formulae IXa and IXb to the compounds of Formulae Iβa(ester) and Iβb(ester). The compounds of Formulae Iβc and Iβd are then isomerized to the compounds of Formulae Iαc and Iαd, in the same manner used to isomerize the compounds of Formulae Iβa(ester) and Iβd(ester) to the compounds of Formulae Iαa(ester) and Iβa(ester).

The compounds of Formulae Xa and Xb can also be subjected to a simultaneous dehydration and isomerization treatment to produce the compounds of Formulae Iαc and Iαd, in the same manner disclosed above for the conversion of the compounds of Formulae IXa and IXb, to the compounds of Formulae Iαa(ester) and Iαb(ester).

Alternatively, the compounds of Formula Xa can be produced as follows: the compounds of Formula XI, such as 3β,17β-dihydroxy-5-androstene and its corresponding 19-nor compound, are treated with a peracid, such as peracetic acid or perbenzoic acid to obtain the corresponding 5,6-epoxy compounds represented by Formula XII, such as 5α,6α-epoxy-3β,17β-dihydroxyandrostane and its corresponding 19-nor compound. The compounds of Formula XII are then treated with hydrofluoric acid, preferably in the presence of an organic solvent, such as methylene chloride, to obtain the compounds of Formula XIII, such as 6β-fluoro-3β,5α,17β-trihydroxyandrostane and its corresponding 19-nor compound. The compounds of Formula XIII are oxidized to the compounds of Formula Xa in the same manner used to oxidize the compounds of Formula VIIIa to the compounds of Formula Xa.

The compounds of Formula Iαe, such as 6α-fluoro-11β-hydroxy-4-androstene-3,17-dione and its corresponding 19-nor compound are produced as follows: the compounds of Formula Iαd, such as 6α-fluoro-4-androstene-3,11,17-trione or its corresponding 19-nor compound are allowed to react with ethylene glycol, in the presence of a strong acid as catalyst, to obtain the compounds of Formula XIV, such as 6-fluoro-5-androstene-3,11,17-trione 3,17-bis-(ethylene ketal) or its corresponding 19-nor compound, respectively. Suitable strong acid catalysts and other suitable alkane-diols which can be used to form the 3,17-bis-(alkylene ketals) of the compounds of Formula Iαd, are those acid catalysts and alkanediols mentioned in connection with the conversion of the compounds of Formula Vb to the compounds of Formula VIb. The thus-obtained compounds of Formula XIV are then treated with a reducing agent, for example, a metal hydride, such as lithium aluminum hydride, sodium borohydride, lithium borohydride, and the like, preferably lithium aluminum hydride, to convert them into the compounds of Formula XV, such as 6-fluoro-11β-hydroxy-5-androstene-3,17-dione 3,17-bis-(ethylene ketal) and its corresponding 19-nor compound. The reduction reaction is carried out in the presence of an organic solvent, for example, ether, benzene, tetrahydrofuran, dioxane, petroleum ether, and the like, which is non-reactive under the conditions of the reaction. The thus-obtained compounds of Formula XV are then treated with a hydrolyzing agent, for example, a dilute aqueous solution of a mineral acid such as sulfuric acid, hydrochloric acid, and the like, preferably, in the presence of an organic solvent such as, for example, methanol, ethanol, dioxane, acetone, and the like, to obtain the compounds of Formula Iαe, such as 6α-fluoro-11β-hydroxy-4-androstene-3,17-dione and its corresponding 19-nor compound. The hydrolysis reaction can also be effected using organic acids, such as formic acid and acetic acid, or other acidic agents.

The compounds of Formula Iαf, such as 6α-fluoro-11β,17β-dihydroxy-4-androsten-3-one, its corresponding 19-nor compound and the 17-acylates thereof [the compounds of Formula Iαf(ester)] are produced as follows: the compounds of Formula Iαd, such as 6α-fluoro-4-androstene-3,11,17-trione or its corresponding 19-nor compound, are allowed to react with a secondary cyclic alkylene amine, preferably pyrrolidine, in accordance with the procedure disclosed in U. S. Patent 2,781,342, to obtain the compounds of Formula XVI, such as 3-(N-pyrrolidinyl)-6-fluoro-3,5-androstadiene-11,17-dione or its corresponding 19-nor compound, respectively. Other amines which can be used to form the 3-enamine derivative are piperidine, C-alkyl substituted piperidines, e. g., 2,4-dimethylpyrrolidine, 3-isopropylpyrrolidine, 3,3-dimethylpyrrolidine, and the like, and morpholine, homomorpholine, and the like. The thus-obtained compounds of Formula XVI are then treated with a reducing agent to obtain the compounds of Formula XVII, such as 3-(N-pyrrolidinyl)-6-fluoro-11β,17β-dihydroxy-3,5-androstadiene or its corresponding 19-nor compound, respectively. The reduction reaction for the conversion of the compounds of Formula XVI to the compounds of Formula XVII is carried out using the method disclosed for the conversion of the compounds of Formula XIV to the compounds of Formula XV. The thus-obtained compounds of Formula XVII are then hydrolyzed with water, aqueous base or acid, alkanols or alkanol water mixtures, to convert them into the compounds of Formula Iαf, such as 6α-fluoro-11β,17β-dihydroxy-4-androsten-3-one and its corresponding 19-nor compound. The compounds of Formula Iαf are then subjected to treatment with an esterifying agent to obtain the 17-acylates thereof represented by Formula Iαf(ester), such as 6α-fluoro-11β,17β-dihydroxy-4-androsten-3-one 17-acylates and their corresponding 19-nor compounds. Suitable esterifying agents are those named above in connection with esterifying the compounds of Formulae VIIIa and VIIIb to the compounds of Formulae IXa and IXb, respectively.

Alternatively, the 11-oxygenated-6-fluoro compounds of the instant invention, namely the compounds represented by Formulae XIX, Iαe, Iαf, Iαf(ester), Iαb(ester), Iαb and Iαd, can be prepared according to the following reaction sequences:

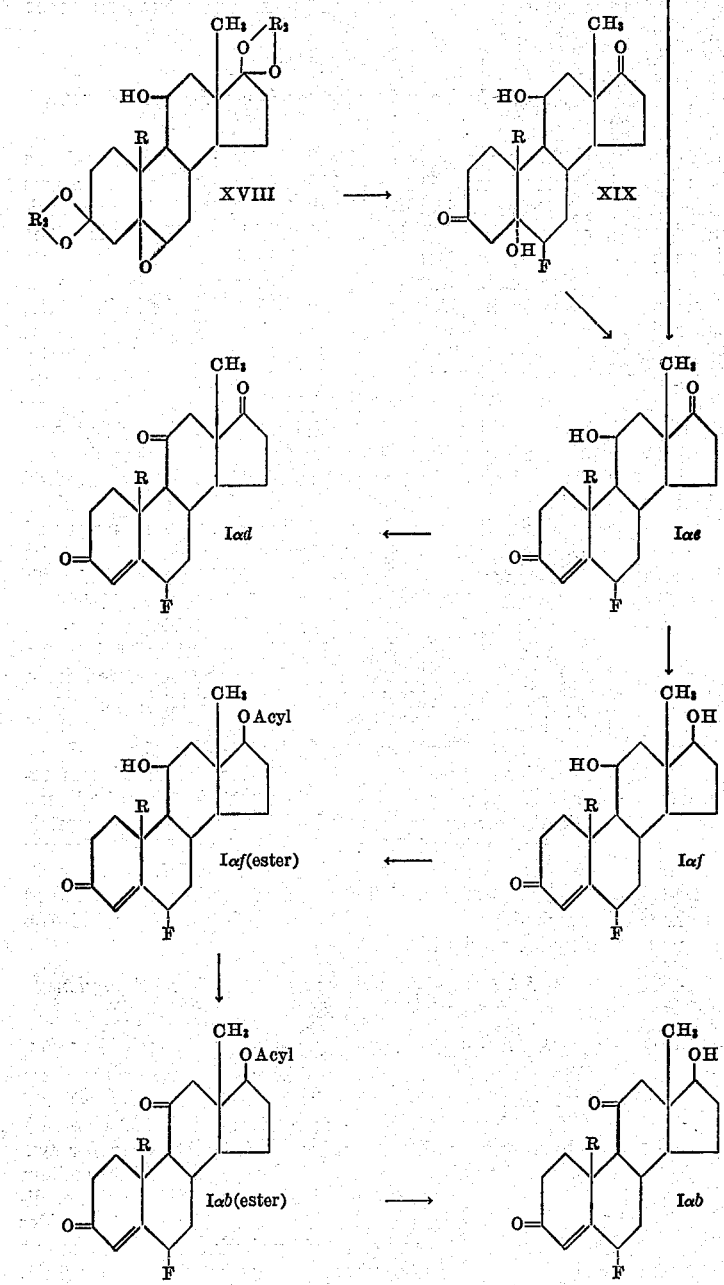

wherein R, R₂, and Acyl have the same meaning as previously given.

The alternative process for the preparation of the compounds of Formulae XIX, Iαe, Iαf, Iαf(ester), Iαb(ester) and Iαb comprises: treating compounds of the type represented by Formula XVIII such as 5α,6α-epoxy-11β-hydroxy-androstane-3,17-dione 3,17-bis-(ethylene ketal) and its corresponding 19-nor compound with a fluorinating agent such as hydrofluoric acid, preferably in the presence of an organic solvent, such as methylene chloride, to obtain the compounds of Formula XIX, such as 6β-fluoro-5α,11β-dihydroxyandrostane-3,17-dione and its corresponding 19-nor compound.

The compounds of Formula XIX are then subjected to simultaneous dehydration and isomerization by treating them at temperatures of zero degrees centigrade or slightly lower in a liquid medium, such as an organic solvent, for example, chloroform, methylene chloride, ether, and the like, and in the presence of prototropic agents (proton donating agents) such as water, alcohols, organic acids, and the like, with a mineral acid, such as hydrogen chloride. The reaction mixture can then be washed with successive portions of water and dilute alkali, such as sodium bicarbonate, followed by recovery of the compounds of Formula I$\alpha e$, such as 6$\alpha$-fluoro-11$\beta$-hydroxy-4-androstene-3,17-dione and its corresponding 19-nor compound.

The compounds of Formula I$\alpha e$ are then treated with sodium borohydride to convert them into the compounds of Formula I$\alpha f$, such as 6$\alpha$-fluoro-11$\beta$,17$\beta$-dihydroxy-4-androsten-3-one and its corresponding 19-nor compound. The compounds of Formula I$\alpha f$ are recovered by conventional means, such as by chromatography.

The thus-obtained compounds of Formula I$\alpha f$ are then subjected to treatment with an esterifying agent to obtain the compounds represented by Formula I$\alpha f$(ester), such as 6$\alpha$-fluoro-11$\beta$,17$\beta$-dihydroxy-4-androsten-3-one 17-acylates and their corresponding 19-nor compounds. Suitable esterifying agents are organic carboxylic acids, particularly hydrocarbon carboxylic acids (in the presence of an esterification catalyst), containing from one to twelve carbon atoms, inclusive, or the acid anhydrides and acid halides thereof, such as those specifically mentioned above.

The compounds represented by Formula I$\alpha f$(ester) are then oxidized, preferably in acetic acid solution, with an oxidizing agent, such as chromic anhydride or sodium dichromate, using a slight excess of the oxidizing agent. At the conclusion of the desired oxidation reaction, the chromic acid oxidant is generally destroyed by addition of methyl alcohol, ethyl alcohol, and the like, and the compounds of Formula I$\alpha b$(ester), such as 6$\alpha$-fluoro-17$\beta$-hydroxy-4-androstene-3,11-dione 17-acylates, and their corresponding 19-nor compounds, are recovered by conventional means.

The compounds of Formula I$\alpha b$(ester) can be converted to the compounds of Formula I$\alpha b$, such as 6$\alpha$-fluoro-17$\beta$-hydroxy-4-androstene-3,11-dione and its corresponding 19-nor compound by hydrolysis with a base, such as potassium carbonate, sodium hydroxide, or the like, preferably sodium hydroxide. After the hydrolysis is complete, the reaction mixture is neutralized with an acid, e. g., acetic acid, and the hydrolyzed product recovered from the reaction mixture by evaporation and crystallization, extraction with methylene chloride, chromatography, and the like, as deemed necessary.

Compound I$\alpha e$ (where R=methyl), namely, 6$\alpha$-fluoro-11$\beta$-hydroxy-4-androstene-3,17-dione, can also be obtained by treating Compound XX, 6$\alpha$-fluoro-11$\beta$,17$\alpha$,21-trihydroxy-4-pregnene-3,20-dione, with sodium bismuthate in the presence of an organic solvent, such as acetic acid. The thus-obtained reaction mixture is then treated with an alkali, preferably an alkali metal hydroxide, such as potassium hydroxide, and extracted with an organic solvent such as methylene chloride, or the like, followed by recovery of Compound I$\alpha e$ (where R=methyl) by conventional means, such as evaporation and crystallization.

An alternative process for the preparation of the compounds of Formula I$\alpha d$, such as 6$\alpha$-fluoro-4-androstene-3,11,17-trione and its corresponding 19-nor compound comprises: oxidizing the compounds of Formula I$\alpha e$ (obtained by converting the compounds of Formula XVIII into the compounds of Formula XIX and converting the latter compounds into the compounds of Formula I$\alpha e$, as described above and in greater detail below), preferably in acetic acid solution, with an oxidizing agent, such as chromic anhydride or sodium dichromate, preferably the latter. The reaction mixture is diluted with water and the compounds of Formula I$\alpha d$ are recovered by conventional means, such as filtration followed by evaporation.

Compound I$\alpha d$ (where R=methyl), namely, 6$\alpha$-fluoro-4-androstene-3,11,17-trione, can also be obtained according to the process which comprises: converting Compound XX into Compound I$\alpha e$ (where R=methyl), as described above and in greater detail below, and treating the thus-obtained Compound I$\alpha e$ (where R=methyl), as described immediately above and in greater detail below, with an oxidizing agent, such as sodium dichromate, preferably in acetic acid solution, and recovering the product, Compound I$\alpha d$ (where R=methyl), by conventional means.

This application is a continuation-in-part of application Serial No. 699,505, filed November 29, 1957, now abandoned.

The following examples are illustrative of the process and products of the present invention, but are not to be construed as limiting.

EXAMPLE 1

A. *17$\beta$-hydroxy-5-androsten-3-one 3-ethylene ketal (Compound VIa$_1$)*

To thirty grams of 17$\beta$-hydroxy-4-androsten-3-one (testosterone), Compound Va$_1$, there was added 2.5 grams of p-toluenesulfonic acid, two hundred milliliters of ethylene glycol and five hundred milliliters of benzene. The solution was then refluxed for 28 hours, the condensate being passed through a water trap to separate the water of reaction. The reaction mixture was washed with water, a dilute sodium bicarbonate solution and again with water. Each of the three aqueous washes was then individually backwashed with benzene and the benzene layers so obtained were combined and added to the reaction mixture. The combined benzene solutions were then dried over magnesium sulfate, filtered, and concentrated to dryness. The dried product was then dissolved in two hundred milliliters of hot methanol, to which there was added twenty milliliters of pyrrolidine to convert unreacted testosterone to its pyrrolidyl enamine. The solution was then concentrated to about 100 milliliters, diluted with methylene chloride, extracted with ice cold 4 N hydrochloride acid and water, the water-soluble testosterone pyrrolidyl enamine hydrochloride formed going into the aqueous layer. The aqueous layer was separated from the methylene chloride layer, and the latter layer was dried over magnesium sulfate, filtered, and concentrated to dryness. The product, 17$\beta$-hydroxy-5-androsten-3-one 3-ethylene ketal, Compound VIa$_1$, so obtained was recrystallized from methanol-ether to which there had been added a few drops of pyridine. The first crop of crystals obtained weighed 7.3 grams, melted at 186–189 degrees centigrade, and had an optical rotation of [$\alpha$]$_D$ minus 42 degrees (CHCl$_3$). The second crop of crystals obtained weighed one gram and had a melting point of 178–184 degrees centigrade.

B. *5,6-epoxy-17$\beta$-hydroxyandrostan-3-one 3-ethylene ketals (Compounds VII$\alpha a_1$ and VII$\beta a_1$)*

To a solution of 8.5 grams of the above obtained ketal, Compound VIa$_1$, in 140 milliliters of chloroform there was added one gram of sodium acetate (anhydrous) and ten milliliters of peracetic acid solution (40 percent) whilst cooling in an ice bath. After standing for two hours, the solution was washed with cold dilute sodium hydroxide and water, dried over magnesium sulfate, filtered, and concentrated to dryness. The $\alpha$ and $\beta$ oxides produced were then separated by chromatography over two hundred grams of synthetic magnesium silicate (Florisil). Elution using 250-milliliter fractions containing increasing amounts of acetone in Skellysolve B hexanes gave first the $\beta$-oxide (10 percent acetone) and then the $\alpha$-oxide (15 percent acetone). The yields were 3.4 and 4.0 grams, respectively.

Recrystallization of the $\alpha$-oxido (5$\alpha$,6$\alpha$-epoxy) compound, 5$\alpha$,6$\alpha$-epoxy-17$\beta$-hydroxyandrostan-3-one 3-ethylene ketal, Compound VII$\alpha a_1$, from acetone-Skellysolve B hexanes gave a product melting at 205–208 degrees centigrade and having an $[\alpha]_D$ minus 68 degrees ($CHCl_3$).

*Analysis.*—Calcd. for $C_{21}H_{32}O_4$: C, 72.38; H, 9.26. Found: C, 72.32; H, 9.31.

Recrystallization of the β-oxido (5β,6β-epoxy) compound, 5β;6β-epoxy-17β-hydroxyandrostan-3-one 3-ethylene ketal, Compound VIIβa₁, from ether-Skellysolve B hexanes gave a product melting at 91–95 degrees centigrade and having an $[\alpha]_D$ minus three degrees ($CHCl_3$).

*Analysis.*—Calcd. for $C_{21}H_{32}O_4$: C, 72.38; H, 9.26. Found: C, 72.36; H, 9.76.

C. 6β - fluoro - 5α,17β - dihydroxyandrostan - 3 - one (Compound VIIIa₁)

14.3 grams of the α-oxide, Compound VIIαa₁, was dissolved in 270 milliliters of methylene chloride and cooled to about eight degrees centigrade. 55 milliliters of 48 percent aqueous hydrofluoric acid were added whilst the reaction mixture was stirred and cooled in an ice bath. After stirring vigorously for two and one-half hours the reaction mixture was poured into 1500 milliliters of ten percent sodium bicarbonate solution containing ice. The mixture was filtered and the filtrate separated into an aqueous layer and a methylene chloride layer. The methylene chloride layer was washed with water, dried over sodium sulfate and then evaporated. There was thus obtained 4.4 grams of material which was then redissolved in methylene chloride and adsorbed on 230 grams of Florisil. Elution, using 230-milliliter fractions, was then carried out with a mixture composed of six parts of acetone, thirty parts of Skellysolve B hexanes and 64 parts of methylene chloride, by volume. Fractions 5 to 12 were combined and recrystallized from acetone to give 1.04 grams of 6β-fluoro-5α,17β-dihydroxyandrostan-3-one, Compound VIIIa₁, melting at 253–254 degrees centigrade and having an $[\alpha]_D$ plus two degrees (acetone).

*Analysis.*—Calcd. for $C_{19}H_{29}FO_3$: C, 70.34; H, 9.01; F, 5.86. Found: C, 70.44; H, 9.04; F, 5.96.

D. 6β-fluoro-5α,17β-dihydroxyandrostan-3-one 17-propionate (Compound IXa₁)

0.85 gram of Compound VIIIa₁ were dissolved in three milliliters of pyridine. This solution was then treated with 1.5 milliliters of propionic anhydride and allowed to stand for five hours. The reaction mixture was cooled and nine milliliters of water were added dropwise with stirring, causing the precipitation of a solid. After one hour the mixture was filtered and the precipitate dried in vacuo at seventy degrees centigrade to give 1.01 grams of 6β-fluoro-5α,17β-dihydroxyandrostan-3-one 17-propionate, Compound IXa₁, melting at 234–235 degrees centigrade.

Similarly, by allowing Compound VIIIa₁ to react with the appropriate hydrocarbon carboxylic acids, or the acid anhydrides and acid halides thereof, there are produced other 17-acylates of 6β-fluoro-5α,17β-dihydroxyandrostan-3-one such as 6β-fluoro-5α,17β-dihydroxyandrostan-3-one 17-formate, 6β-fluoro 5α,17β-dihydroxyandrostan-3-one 17-acetate, 6β-fluoro-5α,17β-dihydroxyandrostan-3-one 17-butyrate, 6β-fluoro-5α,17β-dihydroxyandrostan-3-one 17-valerate, 6β-fluoro-5α,17β-dihydroxyandrostan - 3 - one 17 - hexanoate, 6β - fluoro - 5α,17β-dihydroxyandrostan-3-one 17 - laurate, 6β-fluoro-5α,17β-dihydroxyandrostan-3-one 17-trimethylacetate, 6β-fluoro-5α,17β-dihydroxyandrostan-3-one 17-isobutyrate, 6β-fluoro-5α,17β-dihydroxyandrostan-3-one 17-isovalerate, 6β - fluoro - 5α,17β - dihydroxyandrostan - 3 - one 17-tertiary butylacetate, 6β-fluoro-5α,17β-dihydroxyandrostan-3-one 17-(β-cyclopentylpropionate), 6β-fluoro-5α,17β - dihydroxyandrostan - 3 - one 17 - cyclohexanecarboxylate, 6β - fluoro-5α,17β-dihydroxyandrostan-3-one 17 - cyclohexylacetate, 6β - fluoro - 5α,17β - dihydroxyandrostan-3-one 17-benzoate, 6β-fluoro-5α,17β-dihydroxyandrostan-3-one 17-phenylacetate, 6β-fluoro-5α,17β-dihydroxyandrostan-3-one 17-(β-phenylpropionate), 6β-fluoro - 5α,17β - dihydroxyandrostan - 3 - one 17 - (o-, m-, p-toluate), 6β-fluoro-5α,17β-dihydroxyandrostan-3-one 17-hemisuccinate, 6β-fluoro-5α,17β-dihydroxyandrostan-3-one 17 - hemiadipate, 6β - fluoro-5α,17β-dihydroxyandrostan-3-one 17-acrylate, 6β-fluoro-5α,17β-dihydroxyandrostan-3-one 17-crotonate, 6β-fluoro-5α,17β-dihydroxyandrostan-3-one 17-undecylenate, 6β-fluoro-5α,17β - dihydroxyandrostan - 3 - one 17 - propiolate, 6β - fluoro - 5α,17β - dihydroxyandrostan - 3 - one 17-undecolate, 6β - fluoro - 5α,17β - dihydroxyandrostan - 3-one 17-cinnamate, 6β-fluoro-5α,17β-dihydroxyandrostan-3-one 17-maleate and 6β-fluoro-5α,17β-dihydroxyandrostan-3-one 17-citraconate.

If the esterifying agent is the free acid, the reaction is carried out in the presence of an esterification catalyst.

If the corresponding acylating agent is solid an inert solvent such as toluene, xylene or dioxane can be added to effect solution and to provide a liquid esterification medium.

E. 6β-fluoro-17β-hydroxy-4-androstan-3-one 17-propionate [Compound Iβa₁(ester₁)]

One gram of Compound IXa₁ was dissolved in ten milliliters of pyridine and there was added thereto, with stirring, one gram of N-bromoacetamide. The reaction mixture was allowed to stand for thirty minutes, cooled in an ice bath and anhydrous sulfur dioxide was passed over the liquid surface until 1.57 grams were absorbed. The thus obtained reaction mixture was warmed to about 28 degrees centigrade and maintained at that temperature for one and one-half hours. The reaction mixture was again cooled and there was added dropwise, with stirring, 28 milliliters of a ten percent sulfuric acid solution which caused the precipitation of a solid. The reaction mixture was cooled for two hours at five degrees centigrade. The reaction mixture was filtered and the precipitate obtained was washed with water and dried to give 0.85 gram of product; melting point 112–113 degrees centigrade, $$\lambda_{max}^{alc.} \text{ 234 m}\mu \text{ (log } a_M \text{ 4.12)}$$

Recrystallization from a mixture of five milliliters of methanol and one milliliter of water yielded 0.60 gram of 6β-fluoro-17β-hydroxy-4-androstan-3-one 17-propionate Compound Iβa₁(ester₁), melting at 114–115 degrees centigrate and having an $[\alpha]_D$ zero degrees (chloroform).

*Analysis.*—Calcd. for $C_{22}H_{31}FO_3$: C, 72.89; H, 8.62; F, 5.24. Found: C, 72.86; H, 8.52; F, 5.30.

F. 6α-fluoro-17β-hydroxy-4-androsten-3-one 17-propionate [Compound Iαa₁(ester₁)]

Three hundred milligrams of Compound Iβa₁(ester₁) were dissolved in ten milliliters of reagent grade chloroform (containing traces of alcohol) and the solution cooled in an ice-salt bath. Anhydrous hydrogen chloride was bubbled into the cold solution for twenty minutes, followed by nitrogen for fifteen minutes. The solution was washed with water and there was thus obtained an aqueous and organic layer. The organic layer was dried over sodium sulfate and concentrated in vacuo to give 268 milligrams of residue. The residue was then crystallized from three milliliters of eighty percent methanol to yield 160 milligrams of 6α-fluoro-17β-hydroxy-4-androsten-3-one 17-propionate, Compound Iαa₁(ester₁), melting at 108–110 degrees centigrade and having an $[\alpha]_D$ plus 79 degrees (chloroform).

The infrared absorption (Nujol mull) exhibited bands at 1730 (ester), 1663 (α,β-unsaturated ketone), and 1620 cm.$^{-1}$ (double bond).

G. 6β-fluoro-17β-hydroxy-4-androsten-3-one (Compound Iβa₁)

Following the procedure of Example 1, Parts A through

C, there is obtained Compound VIIIa₁. A solution containing eleven grams of Compound VIIIa₁ in 350 milliliters of absolute ethyl alcohol is cooled to fifteen degrees centigrade and forty milliliters of 0.1 N sodium hydroxide is added thereto. The solution thus-obtained is cooled to about eight degrees centigrade, and after being allowed to stand at that temperature for approximately 24 hours, treated with four milliliters of acetic acid and concentrated to a residue which is extracted with methylene chloride. The methylene chloride extract is washed with water, dried over sodium sulfate, concentrated to about 100 milliliters and chromatographed over 400 grams of Florisil (synthetic magnesium silicate). The chromatographic column is eluted in 200-milliliter fractions with Skellysolve B hexanes containing increasing proportions of acetone, starting with five percent acetone in Skellysolve B hexanes. Those fractions exhibiting an ultra-violet maximum at $\lambda_{max}^{alc.}$ 233–238 m$\mu$ are combined and recrystallized from acetone-Skellysolve B hexanes to give crystals of 6$\beta$-fluoro-17$\beta$-hydroxy-4-androsten-3-one, Compound I$\beta a_1$.

A stoichiometric equivalent amount of Compound I$\beta a_1$ is substituted for Compound I$\beta a_1$(ester₁) in the procedure of Example 1, Part F, to obtain 6$\alpha$-fluoro-17$\beta$-hydroxy-4-androsten-3-one, Compound I$\alpha a_1$. A stoichiometric equivalent amount of Compound I$\alpha a_1$ is substituted for Compound VIIIa₁ in the procedure of Example 1, Part D, to obtain 6$\alpha$-fluoro-17$\beta$-hydroxy-4-androsten-3-one 17-propionate, Compound I$\alpha a_1$(ester₁).

EXAMPLE 2

6$\alpha$-fluoro - 17$\beta$ - hydroxy - 4 - androsten - 3 - one 17 - propionate [Compound I$\alpha a_1$(ester₁)] directly from 6$\beta$-fluoro - 5$\alpha$,17$\beta$ - dihydroxyandrostan - 3 - one 17 - propionate (Compound IXa₁)

The procedure described in Example 1, Parts A through D, was followed to produce Compound IXa₁, 300 milligrams of which is dissolved in 25 milliliters of chloroform and cooled to minus ten degrees centigrade. Anhydrous hydrogen chloride gas is then bubbled through the cold solution for several hours. The reaction mixture is washed with water, five percent sodium bicarbonate solution and again with water. The chloroform reaction mixture remaining after the final washing is dried over sodium sulfate and evaporated. The residue remaining is recrystallized from methanol to give 6$\alpha$-fluoro-17$\beta$-hydroxy - 4 - androsten - 3 - one 17 - propionate, Compound I$\alpha a_1$(ester₁).

Following the procedure of Example 1, Parts A through C, there is obtained Compound VIIIa₁. A stoichiometric equivalent amount of Compound VIIIa₁ is substituted for Compound IXa₁ in the procedure described immediately above to produce 6$\alpha$-fluoro-17$\beta$-hydroxy-4-androsten-3-one, Compound I$\alpha a_1$. The latter compound can then be esterified to Compound I$\alpha a_1$(ester₁) by following the procedure of Example 1, Part D, substituting a stoichiometric equivalent amount of Compound I$\alpha a_1$ for Compound VIIIa₁.

EXAMPLE 3

A. 17$\beta$-hydroxy-5-androstene-3,11-dione 3-ethylene ketal (Compound VIb₁)

A stoichiometric equivalent amount of 17$\beta$-hydroxy-5-androstene-3,11-dione (11-ketotestosterone), Compound Vb₁, is substituted for Compound Va₁ in the procedure of Example 1, Part A, to obtain 17$\beta$-hydroxy-5-androstene-3,11-dione 3-ethylene ketal, Compound VIb₁.

B. 5,6-epoxy-17$\beta$-hydroxyandrostane-3,11-dione 3-ethylene ketals (Compound VII$\alpha b_1$ and VII$\beta b_1$)

A stoichiometric equivalent amount of Compound VIb₁ is substituted for Compound VIa₁ in the procedure of Example 1, Part B, to obtain 5$\alpha$,6$\alpha$-epoxy-17$\beta$-hydroxyandrostane-3,11-dione 3-ethylene ketal, Compound VII$\alpha b_1$, and 5$\beta$,6$\beta$-epoxy-17$\beta$-hydroxyandrostane-3,11-dione 3-ethylene ketal, Compound VII$\beta b_1$, which can be separated as described in Example 1, Part B, i. e., chromatography on Florisil followed by elution with Skellysolve B hexanes containing increasing proportions of acetones.

C. 6$\beta$ - fluoro - 5$\alpha$,17$\beta$ - dihydroxyandrostane - 3,11-dione (Compound VIIIb₁)

A stoichiometric equivalent amount of Compound VII$\alpha b_1$ is substituted for Compound VII$\alpha a_1$ in the procedure of Example 1, Part C, to obtain 6$\beta$-fluoro-5$\alpha$,17$\beta$-dihydroxyandrostane-3,11-dione, Compound VIIIb₁, a crystalline solid.

D. 6$\beta$ - fluoro - 5$\alpha$,17$\beta$ - dihydroxyandrostane - 3,11-dione 17-propionate (Compound IXb₁)

A stoichiometric equivalent amount of Compound VIIIb₁ is substituted for Compound VIIIa₁ in the procedure of Example 1, Part D, to obtain crystals of 6$\beta$-fluoro - 5$\alpha$,17$\beta$ - dihydroxyandrostane - 3,11 - dione 17-propionate, Compound IXb₁.

Similarly, by allowing Compound VIIIb₁ to react with the appropriate hydrocarbon carboxylic acids (in the presence of an esterification catalyst), or the acid anhydrides and acid halides thereof, such as those named above, there are produced other 17-acylates of 6$\beta$-fluoro-5$\alpha$,17$\beta$-dihydroxyandrostane-3,11-dione, as, for example, the 17-acetate, the 17-hemisuccinate, and the 17-benzoate.

E. 6$\beta$ - fluoro - 17$\beta$ - hydroxy - 4 - androstene - 3,11-dione 17-propionate [Compound I$\beta_1$(ester₁)]

A stoichiometric equivalent amount of Compound IXb₁ is substituted for Compound IXa₁ in the procedure of Example 1, Part E, to obtain 6$\beta$-fluoro-17$\beta$-hydroxy-4 - androstene - 3,11 - dione 17 - propionate, Compound I$\beta b_1$(ester₁).

F. 6$\alpha$ - fluoro - 17$\beta$ - hydroxy - 4 - androstene - 3,11-dione 17-propionate [Compound I$\alpha b_1$(ester₁)]

A stoichiometric equivalent amount of Compound I$\beta b_1$(ester₁) is substituted for Compound I$\beta a_1$(ester₁) in the procedure of Example 1, Part F, to obtain 6$\alpha$-fluoro-17$\beta$-hydroxy-4-androstene-3,11-dione 17-propionate, Compound I$\alpha b_1$(ester₁), a crystalline solid.

Following the procedure of Example 1, Parts A through C, using Compound Vb₁ as the starting material, there is obtained Compound VIIIb₁. A stoichiometric equivalent amount of Compound VIIIb₁ is substituted for Compound VIIIa₁ in the procedure of Example 1, Part G, to obtain 6$\beta$-fluoro-17$\beta$-hydroxy-4 - androstene - 3,11 - dione, Compound I$\beta b_1$. A stoichiometric equivalent amount of Compound I$\beta b_1$ is substituted for Compound I$\beta a_1$(ester₁) in the procedure of Example 1, Part F, to obtain 6$\alpha$-fluoro-17$\beta$-hydroxy-4-androstene-3,11-dione, Compound I$\alpha b_1$. A stoichiometric equivalent amount of Compound I$\alpha b_1$ is substituted for Compound VIIIa₁ in the procedure of Example 1, Part D, to obtain 6$\alpha$-fluoro-17$\beta$-hydroxy-4-androstene-3,11-dione 17-propionate, Compound I$\alpha b_1$(ester₁).

EXAMPLE 4

6$\alpha$ - fluoro - 17$\beta$ - hydroxy - 4 - androstene - 3,11 - dione 17-propionate [Compound I$\alpha b_1$(ester₁)] directly from 6$\beta$ - fluoro - 5$\alpha$,17$\beta$ - dihydroxyandrostane - 3,11 - dione 17-propionate (Compound IXb₁)

A stoichiometric equivalent amount of Compound IXb₁ is substituted for Compound IXa₁ in the procedure of Example 2 to obtain 6$\alpha$-fluoro-17$\beta$-hydroxy-4-androstene-3,11-dione 17-propionate, Compound I$\alpha b_1$(ester₁).

The procedure of Example 1, Parts A through C, is followed, substituting a stoichiometric equivalent amount of Compound Vb₁ for Compound Va₁, to obtain Compound VIIIb₁. A stoichiometric equivalent amount of Compound VIIIb₁ is substituted for Compound IXa₁ in the procedure of Example 2 to produce 6α-fluoro-17β-hydroxy-4-androstene-3,11-dione, Compound I$ab_1$. The latter compound can then be esterified to Compound I$ab_1$(ester$_1$) by following the procedure of Example 1, Part D, substituting a stoichiometric equivalent amount of Compound I$ab_1$ for Compound VIII$a_1$.

EXAMPLE 5

A. *17β - hydroxy - 19 - nor - 5 - androsten - 3 - one 3-ethylene ketal (Compound VI$a_2$)*

A stoichiometric equivalent amount of 17β-hydroxy-19-nor-4-androsten-3-one (19-nortestosterone), Compound V$a_2$ is substituted for Compound V$a_1$ in the procedure of Example 1, Part A, to obtain 17β-hydroxy-19-nor-5-androsten-3-one 3-ethylene ketal, Compound VI$a_2$.

B. *5,6 - epoxy - 17β - hydroxy - 19 - norandrosten - 3 - one 3 - ethylene ketals (Compounds VIIα$a_2$ and VIIβ$a_2$)*

A stoichiometric equivalent amount of Compound VI$a_2$ is substituted for Compound VI$a_1$ in the procedure of Example 1, Part B, to obtain 5α,6α-epoxy-17β-hydroxy-19-norandrostan - 3 - one 3 - ethylene ketal, Compound VIIα$a_2$, and 5β,6β-epoxy-17β-hydroxy - 19 - norandrostan-3-one 3-ethylene ketal, Compound VIIβ$a_2$, which can be separated as described in Example 1, Part B.

C. *6β - fluoro - 5α,17β - dihydroxy - 19 - norandrostan-3-one (Compound VIII$a_2$)*

A stoichiometric equivalent amount of Compound VIIα$a_2$ is substituted for Compound VIIα$a_1$ in the procedure of Example 1, Part C, to obtain 6β-fluoro-5α,17β-dihydroxy-19-norandrostan-3-one, Compound VIII$a_2$.

D. *6β - fluoro - 5α,17β - dihydroxy - 19 - norandrostan-3-one-17-propionate (Compound IX$a_2$)*

A stoichiometric equivalent amount of Compound VIII$a_2$ is substituted for Compound VIII$a_1$ in the procedure of Example 1, Part D, to obtain 6β-fluoro-5α,17β-dihydroxy-19-norandrostan-3 - one 17 - propionate, Compound IX$a_2$.

Similarly, by allowing Compound VIII$a_2$ to react with the appropriate hydrocarbon carboxylic acids (in the presence of an esterification catalyst), or the acid anhydrides and acid halides thereof, such as those named above, there are produced other 17-acylates of 6β-fluoro-5α,17β-dihydroxy-19-norandrostan-3-one, as, for example, the 17-acetate, the 17-hemisuccinate, and the 17-benzoate.

E. *6β - fluoro - 17β - hydroxy - 19 - nor - 4 - androsten - 3-one 17 - propionate [Compound Iβ$a_2$(ester$_1$)]*

A stoichiometric equivalent amount of Compound IX$a_2$ is substituted for Compound IX$a_1$ in the procedure of Example 1, Part E, to obtain 6β-fluoro-17β-hydroxy-19-nor-4-androsten-3-one 17-propionate, Compound Iβ$a_2$-(ester$_1$).

F. *6α - fluoro - 17β - hydroxy - 19 - nor - 4 - androsten-3 - one 17 - propionate [Compound Iα$a_2$(ester$_1$)]*

A stoichiometric equivalent amount of Compound Iβ$a_2$(ester$_1$) is substituted for Compound Iβ$a_1$(ester$_1$) in procedure of Example 1, Part F, to obtain 6α-fluoro-17β-hydroxy-19-nor-4-androsten-3-one 17-propionate, Compound Iα$a_2$(ester$_1$), a crystalline solid.

Following the procedure of Example 1, Parts A through C, using Compound V$a_2$ as the starting material, there is obtained Compound VIII$a_2$. A stoichiometric equivalent amount of Compound VIII$a_2$ is substituted for Compound VIII$a_1$ in the procedure of Example 1, Part G, to obtain 6β - fluoro - 17β - hydroxy - 19 - nor - 4 - androsten-3-one, Compound Iβ$a_2$. A stoichiometric equivalent amount of Compound Iβ$a_2$ is substituted for Compound Iβ$a_1$(ester$_1$) in the procedure of Example 1, Part F, to obtain 6α - fluoro - 17β - hydroxy - 19 - nor - 4 - androsten-3-one, Compound Iα$a_2$. A stoichiometric equivalent amount of Compound Iα$a_2$ is substituted for Compound VIII$a_1$ in the procedure of Example 1, Part D, to obtain 6α - fluoro - 17β - hydroxy - 19 - nor - 4 - androsten - 3-one 17 - propionate, Compound Iα$a_2$(ester$_1$).

EXAMPLE 6

*6α - fluoro - 17β - hydroxy - 19 - nor - 4 - androsten - 3-one 17 - propionate [Compound Iα$a_2$(ester$_1$)] directly from 6β - fluoro - 5α,17β - dihydroxy - 19 - norandrostan - 3 - one 17 - propionate (Compound IX$a_2$)*

A stoichiometric equivalent amount of Compound IX$a_2$ is substituted for Compound IX$a_1$ in the procedure of Example 2 to obtain 6α-fluoro-17β-hydroxy-19-nor-4-androsten-3-one 17-propionate, Compound Iα$a_2$(ester$_1$).

The procedure of Example 1, Parts A through C, is followed, substituting a stoichiometric equivalent amount of Compound V$a_2$ for Compound V$a_1$, to obtain Compound VIII$a_2$. A stoichiometric equivalent amount of Compound VIII$a_2$ is substituted for Compound IX$a_1$ in the procedure of Example 2 to produce 6α-fluoro-17β-hydroxy-19-nor-4-androsten-3-one, Compound Iα$a_2$. The latter compound can then be esterified to Compound Iα$a_2$(ester$_1$) by following the procedure of Example 1, Part D, substituting a stoichiometric equivalent amount of Compound Iα$a_2$ for Compound VIII$a_1$.

EXAMPLE 7

A. *17β-hydroxy-19-nor-5-androstene-3,11-dione 3-ethylene ketal (Compound VI$b_2$)*

A stoichiometric equivalent amount of 17β-hydroxy-19-nor-5-androstene-3,11-dione (11-keto-19-nortestosterone), Compound V$b_2$, disclosed in U. S. Patent 2,781,368, is substituted for Compound V$a_1$ in the procedure of Example 1, Part A, to obtain 17β-hydroxy-19-nor-5-androstene-3,11-dione 3-ethylene ketal, Compound VI$b_2$.

B. *5,6-epoxy-17β-hydroxy-19-norandrostane - 3,11 - dione 3-ethylene ketals (Compounds VIIα$b_2$ and VIIβ$b_2$)*

A stoichiometric equivalent amount of Compound VI$b_2$ is substituted for Compound VI$a_1$ in the procedure of Example 1, Part B, to obtain 5α,6α-epoxy-17β-hydroxy-19-norandrostane-3,11-dione 3-ethylene ketal, Compound VIIα$b_2$, and 5β,6β-epoxy-17β-hydroxy-19-norandrostane-3,11-dione 3-ethylene ketal, Compound VIIβ$b_2$, which can be separated as described in Example 1, Part B, i. e., chromatography on Florisil followed by elution with Skellysolve B hexanes containing increasing proportions of acetone.

C. *6β-fluoro-5α,17β-dihydroxy-19 - norandrostane - 3,11-dione (Compound VIII$b_2$)*

A stoichiometric equivalent amount of Compound VIIα$b_2$ is substituted for Compound VIIα$a_1$ in the procedure of Example 1, Part C, to obtain 6β-fluoro-5α,17β-dihydroxy-19-norandrostane-3,11 - dione, Compound VIII$b_2$.

D. *6β-fluoro-5α,17β-dihydroxy-19 - norandrostane - 3,11-dione 17-propionate (Compound IX$b_2$)*

A stoichiometric equivalent amount of Compound VIII$b_2$ is substituted for Compound VIII$a_1$ in the procedure of Example 1, Part D, to obtain 6β-fluoro-5α,17β-dihydroxy-19-norandrostane - 3,11 - dione 17 - propionate, Compound IX$b_2$.

Similarly, by reacting Compound VIII$b_2$ with the appropriate hydrocarbon carboxylic acid (in the presence of an esterification catalyst), or the acid anhydrides and acid halides thereof, such as those named above, there are produced other 17-acylates of 6β-fluoro-5α,17β-dihydroxy-19-norandrostane-3,11-dione, as for example, the 17-acetate, the 17-hemisuccinate, and the 17-benzoate.

E. *6β-fluoro-17β-hydroxy-19-nor-4 - androstene - 3,11-dione 17-propionate [Compound Iβ$b_2$(ester$_1$)]*

A stoichiometric equivalent amount of Compound IX$b_2$ is substituted for Compound $IXa_1$ in the procedure of Example 1, Part E, to obtain 6β-fluoro-17β-hydroxy-19-nor-4-androstene-3,11-dione 17-propionate, Compound $I\beta b_2(ester_1)$.

F. *6α-fluoro-17β-hydroxy-19-nor-4 - androstene - 3,11-dione 17-propionate [Compound $I\alpha b_2(ester_1)$]*

A stoichiometric equivalent amount of Compound $I\beta b_2(ester_1)$ is substituted for Compound $I\beta a_1(ester_1)$ in the procedure of Example 1, Part F, to obtain 6α-fluoro-17β-hydroxy-19-nor-4-androstene-3,11-dione 17-propionate, Compound $I\alpha b_2(ester_1)$, a crystalline solid.

Following the procedure of Example 1, Parts A through C, using Compound $Vb_2$ as the starting material, there is obtained Compound $VIIIb_2$. A stoichiometric equivalent amount of Compound $VIIIb_2$ is substituted for Compound $VIIIa_1$ in the procedure of Example 1, Part G, to obtain 6β-fluoro-17β-hydroxy-19-nor-4-androstene-3,11 - dione, Compound $I\beta b_2$. A stoichiometric equivalent amount of Compound $I\beta b_2$ is substituted for Compound $I\beta a_1(ester_1)$ in the procedure of Example 1, Part F, to obtain 6α-fluoro-17β-hydroxy-19-nor-4-androstene-3,11-dione, Compound $I\alpha b_2$. A stoichiometric equivalent amount of Compound $I\alpha b_2$ is substituted for Compound $VIIIa_1$ in the procedure of Example 1, Part D, to obtain 6α-fluoro-17β-hydroxy-19-nor-4-androstene-3,11-dione 17-propionate, Compound $I\alpha b_2(ester_1)$.

EXAMPLE 8

*6α-fluoro-17β-hydroxy-19-nor-4-androstene-3,11-dione 17-propionate [Compound $I\alpha b_2(ester_1)$] directly from 6β-fluoro-5α,17β-dihydroxy-19 - norandrostane - 3,11-dione 17-propionate (Compound $IXb_2$)*

A stoichiometric equivalent amount of Compound $IXb_2$ is substituted for Compound $IXa_1$ in the procedure of Example 2 to obtain 6α-fluoro-17β-hydroxy-19-nor-4-androstene-3,11-dione 17-propionate, Compound $I\alpha b_2(ester_1)$.

The procedure of Example 1, Parts A through C, is followed, substituting a stoichiometric equivalent amount of Compound $Vb_2$ for Compound $Va_1$ to obtain Compound $VIIIb_2$. A stoichiometric equivalent amount of Compound $VIIIb_2$ is substituted for Compound $IXa_1$ in the procedure of Example 2, to produce 6α-fluoro-17β-hydroxy-19-nor-4-androstene-3,11-dione, Compound $I\alpha b_2$. The latter compound can then be esterified to Compound $I\alpha b_2(ester_1)$ by following the procedure of Example 1, Part D, substituting a stoichiometric equivalent amount of Compound $I\alpha b_2$ for Compound $VIIIa_1$.

EXAMPLE 9

A. *6β-fluoro-5α-hydroxyandrostane-3,17 - dione (Compound $Xa_1$)*

To an ice-bath-cooled solution of three grams of chromic anhydride, 130 milliliters of acetic acid and three milliliters of water, there is added, whilst stirring and cooling, four grams of 6β-fluoro-5α,17β-dihydroxyandrostan-3-one, Compound $VIIIa_1$, obtained by the procedures of Example 1, Parts A through C. After standing for approximately fifteen minutes, the reaction mixture is warmed to about 25 degrees centigrade and allowed to stand for several hours. To the reaction mixture there is then added eleven milliliters of methyl alcohol and 300 milliliters of water, the addition of the latter causing a solid to precipitate. The precipitate is collected and washed with water to give 2.5 grams of crude product. Recrystallization from acetone-Skellysolve B hexanes yields 6β-fluoro-5α-hydroxyandrostane-3,17-dione, Compound $Xa_1$, a crystalline solid.

Alternatively, Compound $Xa_1$ is prepared by epoxidizing 3β,17β-dihydroxy-5-androstene, Compound $XIa_1$, with peracetic acid to produce 5α,6α-epoxy-3β,17β-dihydroxyandrostane, Compound $XIIa_1$. The treatment of Compound $XIIa_1$ with anhydrous hydrogen fluoride in the presence of an anhydrous organic solvent, preferably a mixture of chloroform and tetrahydrofuran, is productive of 6β-fluoro-3β,5α,17β-trihydroxyandrostane, Compound $XIIIa_1$. The latter compound is then oxidized with chromic anhydride to produce 6β-fluoro-5α-hydroxyandrostane-3,17-dione, Compound $Xa_1$.

B. *6β-fluoro-4-androstene-3,17-dione (Compound $I\beta c_1$)*

A stoichiometric equivalent amount of Compound $Xa_1$ is substituted for Compound $IXa_1$ in the procedure of Example 1, Part E, namely, dissolving Compound $Xa_1$ in pyridine, adding N-bromoacetamide, passing anhydrous sulfur dioxide over the liquid and treating with sulfuric acid, to obtain 6β-fluoro-4-androstene-3,17-dione, Compound $I\beta c_1$.

C. *6α-fluoro-4-androstene-3,17-dione (Compound $I\alpha c_1$)*

A stoichiometric equivalent amount of Compound $I\beta c_1$ is substituted for Compound $I\beta a_1(ester)$ in the procedure of Example 1, Part F, namely, bubbling anhydrous hydrogen chloride into a solution of Compound $I\beta c_1$ in chloroform, to prepare 6α - fluoro - 4 - androstene - 3,17-dione, Compound $I\alpha c_1$, isolated as a crystalline solid.

EXAMPLE 10

*6α - fluoro - 4 - androstene - 3,17 - dione (Compound $I\alpha c_1$) directly from 6β-fluoro - 5α - hydroxyandrostane-3,17-dione (Compound $Xa_1$)*

A stoichiometric equivalent amount of Compound $Xa_1$ is substituted for Compound $IXa_1$ in the procedure of Example 2 to obtain 6α-fluoro-4-androstene-3,17-dione, Compound $I\alpha c_1$, directly.

EXAMPLE 11

A. *6β - fluoro - 5α - hydroxyandrostane - 3,11,17 - trione (Compound $Xb_1$)*

A stoichiometric equivalent amount of Compound $VIIIb_1$ is substituted for Compound $VIIIa_1$ in the procedure of Example 9, Part A, to obtain 6β-fluoro-5α-hydroxyandrostane-3,11,17-trione, Compound $Xb_1$.

B. *6β - fluoro - 4 - androstene 3,11,17 - trione (Compound $I\beta d_1$)*

A stoichiometric equivalent amount of Compound $Xb_1$ is substituted for Compound $IXa_1$ in the procedure of Example 1, Part E, to obtain 6β-fluoro-4-androstene-3,11,17-trione, Compound $I\beta d_1$.

C. *6α - fluoro - 4 - androstene - 3,11,17 - trione (Compound $I\alpha d_1$)*

A stoichiometric equivalent amount of Compound $I\beta d_1$ is substituted for Compound $I\beta a_1(ester_1)$ in the procedure of Example 1, Part F, to obtain 6α-fluoro-4-androstene-3,11,17-trione, Compound $I\alpha d_1$, a crystalline solid product.

EXAMPLE 12

*6α - fluoro - 4 - androstene - 3,11,17 - trione (Compound $I\alpha d_1$) directly from 6β - fluoro - 5α - hydroxyandrostane-3,11,17-trione (Compound $Xb_1$)*

A stoichiometric equivalent amount of Compound $Xb_1$ is substituted for Compound $IXa_1$ in the procedure of Example 2 to obtain 6α-fluoro-4-androstene-3,11,17-trione, Compound $I\alpha d_1$, directly.

EXAMPLE 13

A. *6β - fluoro - 5α - hydroxy - 19 - norandrostane - 3,17-dione (Compound $Xa_2$)*

A stoichiometric equivalent amount of Compound $VIIa_2$ is substituted for Compound $VIIIa_1$ in the procedure of Example 9, Part A, to obtain 6β-fluoro-5α-hydroxy-19-norandrostane-3,17-dione, Compound $Xa_2$.

Alternatively, Compound $Xa_2$ is prepared by epoxidizing 3β,17β - dihydroxy - 19 - nor - 5 - androstene, Compound $XIa_2$, [Hartman, J. A. C. S., vol. 77, p. 5151-54

(1955), noting particularly p. 5153], with peracetic acid to produce 5α,6α - epoxy - 3β,17β - dihydroxy - 19 - norandrostane, Compound XIIa₂. The treatment of Compound XIIa₂ with anhydrous hydrogen fluoride in the presence of an anhydrous organic solvent, preferably a mixture of chloroform and tetrahydrofuran, is productive of 6β - fluoro - 3β,5α,17β - trihydroxy - 19 - norandrostane, Compound XIIIa₂. The latter compound is then oxidized with chromic anhydride to produce 6β-fluoro-5α - hydroxy - 19 - norandrostane - 3,17 - dione, Compound Xa₂.

B. 6β - fluoro - 19 - nor - 4 - androstene - 3,17 - dione (Compound Iβc₂)

A stoichiometric equivalent amount of Compound Xa₂ is substituted for Compound IXa₁ in the procedure of Example 1, Part E, to obtain 6β-fluoro-19-nor-4-androstene-3,17-dione, Compound Iβa₂.

C. 6α - fluoro - 19 - nor - 4 - androstene - 3,17 - dione (Compound Iαc₂)

A stoichiometric equivalent amount of Compound Iβc₂ is substituted for Compound Iβa₁(ester₁) in the procedure of Example 1, Part F, to obtain crystals of 6α-fluoro-19-nor-4-androstene-3,17-dione, Compound Iαc₂.

EXAMPLE 14

6α - fluoro - 19 - nor - 4 - androstene - 3,17 - dione (Compound Iαc₂) directly from 6α-fluoro-5α-hydroxy-19-norandrostane-3,17-dione (Compound Xa₂)

A stoichiometric equivalent amount of Compound Xa₂ is substituted for Compound IXa₁ in the procedure of Example 2 to obtain 6α-fluoro-19-nor-4-androstene-3,17-dione, Compound Iαc₂, directly.

EXAMPLE 15

A. 6β - fluoro - 5α - hydroxy - 19 - norandrostane - 3,11, 17-trione (Compound Xb₂)

A stoichiometric equivalent amount of Compound VIIIb₂ is substituted for Compound VIIIa₁ in the procedure of Example 9, Part A, to obtain 6β-fluoro-5α-hydroxy-19-norandrostane-3,11,17-trione, Compound Xb₂.

B. 6β - fluoro -19 - nor - 4 - androstene - 3,11,17 - trione (Compound Iβd₂)

A stoichiometric equivalent amount of Compound Xb₂ is substituted for Compound IXa₁ in the procedure of Example 1, Part E, to obtain 6β-fluoro-19-nor-4-androstene-3,11,17-trione, Compound Iβa₂.

C. 6α - fluoro - 19 - nor - 4 - androstene - 3,11,17 - trione (Compound Iαd₂)

A stoichiometric equivalent amount of Compound Iβd₂ is substituted for Compound Iβa₁(ester₁) in the procedure of Example 1, Part F, to obtain 6α-fluoro-19-nor-4-androstene-3,11,17-trione (Compound Iαd₂) a crystalline solid.

EXAMPLE 16

6α - fluoro - 19 - nor - 4 - androstene - 3,11,17 - trione (Compound Iαd₂) directly from 6α-fluoro-5α-hydroxy-19-norandrostane-3,11,17-trione (Compound Xb₂)

A stoichiometric equivalent amount of Compound Xb₂ is substituted for Compound IXa₁ in the procedure of Example 2 to obtain 6α-fluoro-19-nor-4-androstene-3,11,17-trione, Compound Iαd₂.

EXAMPLE 17

A. 6 - fluoro-5-androstene-3,11,17-trione 3,17-bis-(ethylene ketal) (Compound XIV₁)

To five grams of 6α-fluoro-4-androstene-3,11,17-trione, Compound Iαd₁, there is added 150 milligrams of p-toluene-sulfonic acid, forty milliliters of ethylene glycol and 250 milliliters of benzene. The mixture is stirred vigorously and then refluxed, using a water trap to remove water of reaction, for approximately 7.5 hours. The thus-obtained reaction mixture is cooled, washed with water, ten percent aqueous potassium bicarbonate solution and again with water. The washed benzene layer obtained, following the second water washing, is separated and dried over sodium sulfate. The solvent is removed from the benzene solution by distillation and the residue remaining is recrystallized from aqueous acetone containing five drops of pyridine to give 6-fluoro-5-androstene-3,11,17-trione 3,17-bis-(ethylene ketal), Compound XIV₁.

B. 6 - fluoro - 11β-hydroxy-5-androstene-3,17-dione 3-17-bis-(ethylene ketal) (Compound XV₁)

A solution of three grams of Compound XIV₁ in 125 milliliters of anhydrous tetrahydrofuran is added, over approximately a five minute period, whilst stirring under nitrogen, to a mixture of 1.2 grams of lithium aluminum hydride and 75 milliliters of anhydrous diethyl ether. The reaction mixture is stirred at room temperature for approximately fifteen minutes, cooled in an ice bath, followed by the cautious addition of fifteen milliliters of water. The thus-obtained mixture is then thoroughly extracted with ether. The ether extract is washed with water, dried over sodium sulfate, and distilled to give a residue of crude 6-fluoro-11β-hydroxy-5-androstene-3,17-dione 3,17-bis-(ethylene ketal), Compound XV₁.

C. 6α - fluoro - 11β - hydroxy - 4 - androstene - 3,17 - dione (Compound Iαe₁)

To the crude residue of Compound XV₁ there is added forty milliliters of acetic acid and fifteen milliliters of water. The reaction mixture is warmed on a steam bath at approximately 95 degrees centigrade for about 45 minutes, cooled to room temperature and poured onto 150 grams of ice, with stirring until the ice melts. The reaction mixture is carefully treated portionwise with thirty grams of solid sodium bicarbonate, whilst continuously stirring. The mixture thus-obtained is extracted with methylene chloride. The methylene chloride extract is washed with water, dried over sodium sulfate and chromatographed over 300 grams of synthetic magnesium silicate (Florisil), followed by elution using 100-milliliter fractions of Skellysolve B hexanes plus increasing proportions of acetone from one to fifty percent. The fractions are subjected to infrared analyses and those fractions which show bands for hydroxyl and 3,17-carbonyl groups are combined and crystallized from an acetone-hexane mixture to give crystals of 6α-fluoro-11β-hydroxy-4-androstene-3,17-dione, Compound Iαe₁.

EXAMPLE 18

A. 6 - fluoro-19-nor-5-androstene-3,11,17-trione 3,17-bis-(ethylene ketal) (Compound XIV₂)

A stoichiometric equivalent amount of 6α - fluoro-19-nor-5-androstene-3,11,17-trione, Compound Iαd₂, is substituted for Compound Iαd₁ in the procedure of Example 17, Part A, to obtain 6-fluoro-19-nor-5-androstene-3,11,17 - trione 3,17 - bis - (ethylene ketal), Compound XIV₂.

B. 6 - fluoro - 11β - hydroxy - 19 - nor - 5 - androstene - 3,17-dione 3,17-bis-(ethylene ketal) (Compound XV₂)

A stoichiometric equivalent amount of Compound XIV₂ is substituted for Compound XIV₁ in the procedure of Example 17, Part B, to obtain a crude residue of 6-fluoro-11β-hydroxy-19-nor-5-androstene-3,17-dione 3,17-bis-(ethylene ketal), Compound XV₂.

C. 6α - fluoro - 11β - hydroxy - 19 - nor - 4 - androstene - 3,17-dione (Compound Iαe₂)

The crude residue of Compound XV₂ is substituted for the crude residue of Compound XV₁ in the procedure of Example 17, Part C, to obtain 6α-fluoro-11β-hydroxy- 19-nor-4-androstene-3,17-dione, Compound I$\alpha e_2$, a crystalline solid.

EXAMPLE 19

A. 3 - (N - pyrrolidinyl) - 6- fluoro - 3,5 - androstadiene-11,17-dione (Compound $XVI_1$)

A mixture of 3.18 grams of 6$\alpha$-fluoro-4-androstene-3,11,17-trione, Compound I$\alpha d_1$, and thirty milliliters of methyl alcohol is heated to approximately the boiling point, cooled slightly and treated with 0.78 gram of pyrrolidine. Upon stirring the reaction mixture gently and allowing it to cool to room temperature a solid material separates. The entire reaction mixture is refrigerated at approximately zero degrees centigrade for several hours and the precipitated material is isolated by filtration, washed with methyl alcohol, and dried to yield 3-(N-pyrrolidinyl) - 6 - fluoro - 3,5 - androstadiene - 11,17 - dione, Compound $XVI_1$.

B. 3 - (N - pyrrolidinyl) - 6 - fluoro - 11$\beta$,17$\beta$ - dihydroxy-3,5-androstadiene (Compound $XVII_1$)

A solution of two grams of Compound $XVI_1$ in ninety milliliters of anhydrous tetrahydrofuran is added, over approximately a five minute period, whilst stirring under nitrogen, to a mixture of one gram of lithium aluminum hydride and sixty milliliters of anhydrous diethyl ether. The reaction mixture is stirred at room temperature for approximately fifteen minutes, followed by the cautious addition of twelve milliliters of water. The thus-obtained reaction mixture is then thoroughly extracted with ether. The ether extract is washed with water, and dried over sodium sulfate. The solvent (ether) is then removed at room temperature under reduced pressure to give a crude residue of 3-(N-pyrrolidinyl)-6-fluoro-11$\beta$,17$\beta$-dihydroxy-3,5-androstadiene, Compound $XVII_1$.

C. 6$\alpha$ - fluoro - 11$\beta$,17$\beta$ - dihydroxy - 4 - androsten 3 - one (Compound I$\alpha f_1$)

The crude residue of Compound $XVII_1$ is heated at reflux for several hours in a buffered acetate solution of 2.5 grams of sodium acetate, eight milliliters of water, 2.5 milliliters of acetic acid and fifty milliliters of methyl alcohol. Upon dilution with water and cooling, a solid material separates. The solid material is isolated and recrystallized from an acetone-hexane mixture to give crystals of 6$\alpha$-fluoro-11$\beta$,17$\beta$-dihydroxy-4-androsten-3-one, Compound I$\alpha f_1$.

D. 6$\alpha$ - fluoro - 11$\beta$,17$\beta$ - dihydroxy - 4 - androsten - 3 - one 17-propionate [Compound I$\alpha f_1$(ester$_1$)]

A mixture of 0.3 gram of Compound I$\alpha f_1$ in two milliliters of dry pyridine is cooled to approximately fifteen degrees centigrade and treated with 1.5 milliliters of propionic anhydride. The reaction mixture is allowed to stand at approximately 25 degrees centigrade for about eight hours and then is poured into forty milliliters of water and stirred for five hours with the formation of a solid material. The solid material is isolated, washed with water, dried, and recrystallized from an ether-hexane mixture to give crystals of 6$\alpha$-fluoro-11$\beta$,17$\beta$-dihydroxy-4-androsten-3-one 17-propionate, Compound I$\alpha f_1$(ester$_1$).

Similarly, by reacting Compound I$\alpha f_1$ with the appropriate hydrocarbon carboxylic acids (in the presence of an esterification catalyst), or the acid anhydrides and acid halides thereof, such as those named above, there are produced other 17-acylates of 6$\alpha$-fluoro-11$\beta$,17$\beta$-dihydroxy-4-androsten-3-one as, for example, the 17-acetate, the 17-hemisuccinate, and the 17-benzoate.

EXAMPLE 20

A. 3 - (N - pyrrolidinyl) - 6 - fluoro - 19 - nor - 3,5 - androstadiene-11,17-dione (Compound $XVI_2$)

A stoichiometric equivalent amount of 6$\alpha$-fluoro-19-nor-4-androstene-3,11,17-trione, Compound I$\alpha d_2$, is substituted for Compound I$\alpha d_1$ in the procedure of Example 19, Part A, to obtain 3-(N-pyrrolidinyl)-6-fluoro-19-nor-3,5-androstadiene11,17-dione, Compound $XVI_2$.

B. 3 - (N - pyrrolidinyl) - 6 - fluoro - 11$\beta$,17$\beta$ - dihydroxy-19-nor-3,5-androstadiene (Compound $XVII_2$)

A stoichiometric equivalent amount of Compound $XVI_2$ is substituted for Compound $XVI_1$ in the procedure of Example 19, Part B, to obtain a crude residue of 3 - (N - pyrrolidinyl) - 6 - fluoro - 11$\beta$,17$\beta$ - dihydroxy-10-nor-3,5-androstadiene, Compound $XVII_2$.

C. 6$\alpha$ - fluoro - 11$\beta$,17$\beta$ - dihydroxy - 19 - nor - 4 - androsten-3-one (Compound I$\alpha f_2$)

The crude residue of Compound $XVII_2$ is substituted for the crude residue of Compound $XVII_1$ in the procedure of Example 19, Part C, to obtain 6$\alpha$-fluoro-11$\beta$,17$\beta$-dihydroxy-19-nor-4-androsten-3-one, Compound I$\alpha f_2$.

D. 6$\alpha$ - fluoro - 11$\beta$,17$\beta$ - dihydroxy - 19 - nor - 4 - androsten-3-one 17-propionate [Compound I$\alpha f_2$(ester$_1$)]

A stoichiometric equivalent amount of Compound I$\alpha f_2$ is substituted for Compound I$\alpha f_1$ in the procedure disclosed in Example 1, Part D, to obtain 6$\alpha$-fluoro-11$\beta$, 17$\beta$-dihydroxy-19-nor-4-androsten-3-one 17-propionate, Compound I$\alpha f_2$(ester$_1$).

Similarly, by reacting Compound I$\alpha f_2$ with the appropriate hydrocarbon carboxylic acids (in the presence of an esterification catalyst), or the acid anhydrides and acid halides thereof, such as those named above, there are produced other 17-acylates of 6$\alpha$-fluoro-11$\beta$,17$\beta$-dihydroxy-19-nor-4-androsten-3-one.

EXAMPLE 21

A. 6$\beta$ - fluoro - 5$\alpha$,11$\beta$ - dihydroxyandrostane - 3,17 - dione (Compound $XIX_1$)

Three grams of 5$\alpha$,6$\alpha$-epoxy-11$\beta$-hydroxyandrostane-3,17-dione 3,17-bis-(ethylene ketal), Compound $XVIII_1$ (prepared according to the procedure disclosed in copending application Serial No. 661,626, filed May 27, 1957) in 25 milliliters of methylene chloride contained in a polyethylene bottle is treated with nine milliliters of 48 percent hydrofluoric acid. The reaction mixture thus-obtained is stirred at room temperature for several hours and then cautiously poured into a mixture of 45 milliliters of methylene chloride and fifty milliliters of ice cold 1.5 molar aqueous sodium carbonate solution and stirred with caution. Upon standing the mixture separates into an aqueous and a methylene chloride layer. The layers are separated and the methylene chloride layer is washed with water and dried over sodium sulfate. Evaporation of the methylene chloride gives a residue which contains 6$\beta$-fluoro-5$\alpha$,11$\beta$-dihydroxyandrostane-3,17-dione, Compound $XIX_1$.

B. 6$\alpha$ - fluoro - 11$\beta$ - hydroxy - 4 - androstene - 3,17 - dione (Compound I$\alpha e_1$)

The residue, containing Compound $XIX_1$, produced in Example 21, Part A, above, is dissolved in 200 milliliters of chloroform and seven milliliters of ethyl alcohol and treated with anhydrous hydrogen chloride gas, whilst maintaining the temperature at approximately from minus five to minus ten degrees centigrade. The solution thus-obtained is washed with successive portions of water, aqueous sodium bicarbonate solution and water, dried over sodium sulfate, concentrated to 35 milliliters and chromatographed over 75 grams of activated alumina. The chromatographic column is eluted with Skellysolve B hexanes plus increasing proportions of acetone from two to fifty percent and collected in fifty-milliliters fractions. Fractions 8 through 19 are combined and the solvent removed by evaporation leaving a residue. The residue is recrystallized from methylene chloride-hexane to give 6$\alpha$ - fluoro - 11$\beta$ - hydroxy - 4 - androstene - 3,17-dione, Compound I$\alpha e_1$; a crystalline solid.

C. 6α-fluoro-11β,17β-dihydroxy-4-androsten-3-one (Compound Iαf₁)

A mixture of 200 milligrams of Compound Iαe₁ and fifty milliliters of methyl alcohol is cooled to approximately zero degrees centigrade and treated with 22.4 milligrams (1.5 moles) of analytically pure sodium borohydride. The reaction mixture is allowed to stand at about zero degrees centigrade for approximately one hour, acidified with two drops of acetic acid and taken to dryness in vacuo. The residue is triturated thoroughly with methylene chloride and the solution thus-obtained washed with water, dried over sodium sulfate, concentrated to thirteen milliliters and chromatographed over ten grams of activated alumina. The chromatographic column is eluted with benzene plus increasing proportions of acetone from four to fifty percent and collected in five-milliliter fractions. The solvent is removed from each fraction and the residue obtained from each fraction is subjected to infrared analysis. Those residues which show the characteristic bands for the 3-keto-Δ⁴-system and no band for the C₁₇ carbonyl group are combined and recrystallized from chloroform-Skellysolve C heptanes to give crystals of 6α-fluoro-11β,17β-dihydroxy-4-androsten-3-one, Compound Iαf₁.

D. 6α-fluoro-11β,17β-dihydroxy-4-androsten-3-one 17-acetate [Compound Iαf₁(ester₂)]

A mixture of 0.30 gram of Compound Iαf₁ in two milliliters of pyridine is cooled and treated with 1.5 milliliters of acetic anhydride. The reaction mixture is allowed to stand at 25 degrees centigrade for approximately eight hours and then poured into forty milliliters of ice-water whereupon a solid precipitates. The thus-obtained mixture is stirred for two hours. The solid product is recovered by filtration, washed with water, dried and recrystallized from ether-hexane to give crystals of 6α-fluoro-11β,17β-dihydroxy-4-androsten-3-one 17-acetate, Compound Iαf₁(ester₂).

Similarly, by reacting Compound Iαf₁ with the appropriate hydrocarbon carboxylic acids, or the acid anhydrides and acid halides thereof, there are produced other 17-acylates of 6α-fluoro-11β,17β-dihydroxy-4-androsten-3-one such as 6α-fluoro-11β,17β-dihydroxy-4-androsten-3-one 17-formate, 6α-fluoro-11β,17β-dihydroxy-4-androsten-3-one 17-propionate, 6α-fluoro-11β,17β-dihydroxy-4-androsten-3-one 17-butyrate, 6α-fluoro-11β,17β-dihydroxy-4-androsten-3-one 17-valerate, 6α-fluoro-11β,17β-dihydroxy-4-androsten-3-one 17-hexanoate, 6α-fluoro-11β,17β-dihydroxy-4-androsten-3-one 17-laurate, 6α-fluoro-11β,17β-dihydroxy-4-androsten-3-one 17-trimethylacetate, 6α-fluoro-11β,17β-dihydroxy-4-androsten-3-one 17-isobutyrate, 6α-fluoro-11β,17β-dihydroxy-4-androsten-3-one 17-isovalerate, 6α-fluoro-11β,17β-dihydroxy-4-androsten-3-one 17-tertiary butylacetate, 6α-fluoro-11β,17β-dihydroxy-4-androsten-3-one 17-(β-cyclopentylpropionate), 6α-fluoro-11β,17β-dihydroxy-4-androsten-3-one 17-cyclohexane-carboxylate, 6α-fluoro-11β,17β-dihydroxy-4-androsten-3-one 17-cyclohexylacetate, 6α-fluoro-11β,17β-dihydroxy-4-androsten-3-one 17-benzoate, 6α-fluoro-11β,17β-dihydroxy-4-androsten-3-one 17-phenyl-acetate, 6α-fluoro-11β,17β-dihydroxy-4-androsten-3-one 17-(β-phenylpropionate), 6α-fluoro-11β,17β-dihydroxy-4-androsten-3-one 17-(o-, m-, p-toluate), 6α-fluoro-11β,17β-dihydroxy-4-androsten-3-one 17-hemisuccinate, 6α-fluoro-11β,17β-dihydroxy-4-androsten-3-one 17-hemiadipate, 6α-fluoro-11β,17β-dihydroxy-4-androsten-3-one 17-acrylate, 6α-fluoro-11β,17β-dihydroxy-4-androsten-3-one 17-crotonate, 6α-fluoro-11β,17β-dihydroxy-4-androsten-3-one 17-undecylenate, 6α-fluoro-11β,17β-dihydroxy-4-androsten-3-one 17-propiolate, 6α-fluoro-11β,17β-dihydroxy-4-androsten-3-one 17-undecolate, 6α-fluoro-11β,17β-dihydroxy-4-androsten-3-one 17-cinnamate, 6α-fluoro-11β,17β-dihydroxy-4-androsten-3-one 17-maleate, and 6α-fluoro-11β,17β-dihydroxy-4-androsten-3-one 17-citraconate.

If the corresponding acylating agent is solid an inert solvent such as toluene, xylene, or dioxane can be added to effect solution and to provide a liquid esterification medium.

If the esterifying agent is the free acid, the reaction is carried out in the presence of an esterification catalyst.

E. 6α-fluoro-17β-hydroxy-4-androstene-3,11-dione 17-acetate [Compound Iαb₁(ester₂)]

A solution of 148 milligrams of Compound Iαf₁(ester₂) in eight milliliters of glacial acetic acid is treated with a solution of 74 milligrams of chromic anhydride in 0.4 milliliter of water and eight milliliters of acetic acid for five hours at room temperature. There is then added two milliliters of methyl alcohol, the mixture is concentrated in vacuo and the residue obtained is diluted with water followed by extraction with ether. The ether solution is washed with successive portions of dilute aqueous sodium carbonate solution, followed by removal of the water and ether to leave a residue. The residue is recrystallized from ether-Skellysolve B hexanes to give 6α-fluoro-17β-hydroxy-4-androstene-3,11-dione 17-acetate, Compound Iαb₁(ester₂), a crystalline solid.

F. 6α-fluoro-17β-hydroxy-4-androstene-3,11-dione (Compound Iαb₁)

One gram of Iαb₁(ester₂) dissolved in fifty milliliters of methyl alcohol is treated with 8.25 milliliters of 0.5 N sodium hydroxide solution (aqueous) and the mixture is allowed to stand at room temperature for approximately 48 hours. One drop of acetic acid is added and the mixture is concentrated to dryness under reduced pressure. The residue is recrystallized from aqueous acetone to give crystals of 6α-fluoro-17β-hydroxy-4-androstene-3,11-dione, Compound Iαb₁.

PREPARATION A

1. The 3-ethylene ketal of methyl 3,11-diketo-5α,6α-epoxy-17(20)-[cis]-pregnen-21-oate To a solution of 5.0 grams of the 3-ethylene glycol ketal of methyl 3,11-diketo-4,17(20)-[cis]-pregnadien-21-oate, prepared in the manner described in U. S. Patent 2,707,184, in 100 milliliters of chloroform was added a chilled solution of 1.9 grams of perbenzoic acid dissolved in 31.5 milliliters of chloroform. The solution was maintained at about four degrees centigrade for 24 hours, and then at room temperature for 72 hours. The solution was then washed with a five percent aqueous solution of sodium bicarbonate and then with water. The chloroform layer was separated, dried, and the solvent distilled to give a residue of 5.3 grams of solid. Crystallization of this solid from methanol gave 2.24 grams of product melting at 180 to 195 degrees centigrade and after two crystallizations from methanol, there was obtained pure 3-ethylene ketal of methyl 3,11-diketo-5α,6α-epoxy-17(20)-[cis]-pregnen-21-oate melting at 206 to 209 degrees centigrade having an $[\alpha]_D$ of plus 37 degrees (CHCl₃) and having the analysis given below:

Analysis.—Calcd. for $C_{24}H_{32}O_6$: C, 69.20; H, 7.75. Found: C, 69.59; H, 7.81.

2. Methyl 3,11-diketo-5α,6β-dihydroxy-17(20)-allopregnen-21-oate and methyl 3,11-diketo-5α-hydroxy-6β-fluoro-17(20)-allopregnen-21-oate To a solution of 1.73 grams of 3-ethylene ketal of methyl 3,11-diketo-5α,6α-epoxy-17(20)-[cis]-pregnen-21-oate in sixteen milliliters of methylene chloride was added six milliliters of 48 percent hydrofluoric acid. The heterogeneous mixture was stirred for two hours, made slightly basic with 300 milliliters of five percent sodium bicarbonate solution, and extracted with methylene chloride.

The extract was washed, dried, and evaporated to dryness to give 1.62 grams of crude solid. Chromatography gave two fractions: A, 481 milligrams eluted with methylene chloride plus five percent acetone and B, 921 milligrams eluted with methylene chloride plus ten and twenty percent acetone. Crystallization of Fraction A from acetone-Skellysolve B hexanes gave 390 milligrams of methyl 3,11-diketo-5α-hydroxy-6β-fluoro-17(20)-allopregnen-21-oate, melting point 254 to 260 degrees centigrade. An analytical sample melted at 260 to 263 degrees centigrade.

Analysis.—Calcd. for $C_{22}H_{29}O_5F$: F, 4.84. Found: F, 4.47.

Fraction B, on crystallization from acetone-Skellysolve B hexanes, gave 470 milligrams of methyl 3,11-diketo-5α,6β-dihydroxy-17(20)-allopregnen-21-oate, melting point 235 to 245 degrees centigrade. An analytical sample melted at 245 to 248 degrees centigrade.

Analysis.—Calcd. for $C_{22}H_{30}O_6$: C, 67.67; H, 7.74. Found: C, 67.91; H, 7.62.

3. *Methyl 3,11-diketo-5α-hydroxy-6β-fluoro-17(20)-allopregnen-21-oate 3-ethylene ketal*

A mixture of 1.9 grams of methyl 3,11-diketo-5α-hydroxy-6β-fluoro-17(20)-allopregnen-21-oate, 59 milligrams of p-toluenesulfonic acid monohydrate and 31 milliliters of distilled ethylene glycol was added to 800 milliliters of benzene. The mixture was stirred and refluxed for two hours, with the condensate passing through a water trap to remove the water. After reflux the mixture was cooled, washed with water, and evaporated to dryness to give a crude solid which on recrystallization from acetone-Skellysolve B hexanes gave 1.96 grams of methyl 3,11-diketo-5α-hydroxy-6β-fluoro-17(20)-allopregnen-21-oate 3-ethylene ketal, melting point 170 to 173 degrees centigrade.

Following the above procedure, substituting other dihydric alcohols for ethylene glycol, for example, 1,2-propylene glycol, 2,3-butanediol, 1,3-butanediol and 2,3-pentanediol is productive of the respective 3-alkylene ketals of methyl 3,11-diketo-5α-hydroxy-6β-fluoro-17(20)-allopregnen-21-oate.

4. *5α,11β,21-trihydroxy-6β-fluoro-17(20)-allopregnen-3-one 3-ethylene ketal*

To a solution of 1.96 grams of methyl 3,11-diketo-5α-hydroxy-6β-fluoro-17(20)-allopregnen-21-oate 3-ethylene ketal in 850 milliliters of anhydrous ether was added 3.7 grams of lithium aluminum hydride and the mixture was stirred for a period of one hour. 200 milliliters of water was added slowly and the ether phase separated. The aqueous phase was extracted with ethyl acetate and the extracts added to the ether phase. The combined ether-ethyl acetate solution was washed with water, dried and evaporated to dryness under reduced pressure. The crude solid residue was crystallized from acetone-Skellysolve B hexanes to give 1.30 grams of 5α,11β,21-trihydroxy-6β-fluoro-17(20)-allopregnen-3-one 3-ethylene ketal, melting point 197 to 205 degrees centigrade. An additional 226 milligrams was obtained from the mother liquor, melting point 175 to 185 degrees centigrade.

5. *5α,11β-dihydroxy-6β-fluoro-21-acetoxy-17(20)-allopregnen-3-one 3-ethylene ketal*

The acetate was prepared by allowing 0.87 gram of 5α,11β,21-trihydroxy-6β-fluoro-17(20)-allopregnen-3-one 3-ethylene ketal to stand overnight in ten milliliters of acetic anhydride and ten milliliters of pyridine. The solution was then poured into ice water to give 0.92 gram of 5α,11β-dihydroxy-6β-fluoro-21-acetoxy-17(20)-allopregnen-3-one 3-ethylene ketal, melting point 140 to 150 degrees centigrade, which on recrystallization from acetone-Skellysolve B hexanes gave 0.77 gram, melting point 149 to 153 degrees centigrade.

Similarly, other 21-organic carboxylic esters of 5α,11β,21-trihydroxy-6β-fluoro-17(20)-allopregnen-3-one 3-ethylene ketals are prepared wherein the 21-acyloxy group is formyloxy, propionyloxy, butyryloxy, valeryloxy, hexanoyloxy, heptanoyloxy, octanoyloxy, benzoyloxy, phenylacetoxy, or the like, by contacting 5α,11β,21-trihydroxy-6β-fluoro-17(20)-allopregnen-3-one 3-ethylene ketal with an appropriate acylating agent, e. g., the anhydride or acid halide of the selected acid in a solvent such as, for example, benzene, toluene, pyridine, or the like.

6. *5α,11β,17α-trihydroxy-6β-fluoro-21-acetoxyallopregnane-3,20-dione 3-ethylene ketal*

To a solution of 0.77 gram of 5α,11β-dihydroxy-6β-fluoro-21-acetoxy-17(20)-allopregnen-3-one 3-ethylene ketal in 35 milliliters of tertiary butyl alcohol was added one milliliter of pyridine, 1.9 milliliters of N-methylmorpholine oxide peroxide solution, and 13.1 milligrams of osmium tetroxide (9.-milliliters of tertiary butyl alcohol solution containing 1.44 milligrams $OsO_4$ per milliliter). The solution was stirred for a period of 2.5 hours, fifteen milliliters of five percent sodium hydrosulfite added, stirred for an additional ten minutes, 0.7 gram of finely ground synthetic magnesium silicate added, stirred for a period of twenty minutes more and filtered. The filtrate was taken to dryness under reduced pressure (below fifty degrees centigrade) and the residue dissolved in methylene chloride, washed with water, dried and evaporated to dryness. This residue was crystallized from acetone-Skellysolve B hexanes to give 0.47 gram of 5α,11β,17α-trihydroxy-6β-fluoro-21-acetoxyallopregnane-3,20-dione 3-ethylene ketal, melting point 220 to 228 degrees centigrade.

7. *5α,11β,17α-trihydroxy-6β-fluoro-21-acetoxyallopregnane-3,20-dione*

A solution of 0.47 gram of 5α,11β,17α-trihydroxy-6β-fluoro-21-acetoxyallopregnane-3,20-dione 3-ethylene ketal in 35 milliliters of acetone and four milliliters of 1N sulfuric acid solution was gently boiled on the steam bath for ten minutes, cooled and neutralized with dilute sodium bicarbonate solution. Addition of water and cooling gave 0.33 gram of 5α,11β,17α-trihydroxy-6β-fluoro-21-acetoxyallopregnane-3,20-dione, melting point 230 to 240 degrees centigrade.

8. *6β-fluoro-11β,17α-dihydroxy-21-acetoxy-4-pregnene-3,20-dione (6β-fluorohydrocortisone acetate)*

A solution of 100 milligrams of 5α,11β,17α-trihydroxy-6β-fluoro-21-acetoxyallopregnane-3,20-dione in 4.9 milliliters of acetic acid and 0.1 milliliter of water was refluxed for a period of one hour, cooled, diluted with fifty milliliters of water and evaporated to dryness under reduced pressure. The residue was chromatographed over Florisil (synthetic magnesium silicate) to give one fraction (77 milligrams) eluted with methylene chloride plus ten percent acetone. Crystallization from acetone-Skellysolve B hexanes gave 38 milligrams of 6β-fluoro-11β,17α-dihydroxy-21-acetoxy-4-pregnene-3,20-dione (6β-fluorohydrocortisone acetate), melting point 210 to 218 degrees centigrade. Infrared data and ultraviolet data were found to be in agreement with the structure.

9. *Isomerization of 6β- to 6α-fluorohydrocortisone acetate*

A solution of 0.132 gram of 6β-fluorohydrocortisone acetate in twelve milliliters of chloroform and 0.1 milliliter of absolute alcohol was cooled to minus ten degrees centigrade in an ice-salt bath and a stream of anhydrous hydrochloric acid was gently bubbled through the solution for 2.5 hours while the temperature was maintained between minus five and minus fifteen degrees centigrade. The solution was then diluted with 25 milliliters of chloroform, washed with dilute sodium bicarbonate and water, dried over anhydrous sodium sulfate, and evaporated to dryness under reduced pressure at sixty degrees centigrade or less. Crystallization of the residue from acetone-Skellysolve B gave 42 milligrams of product, 6α-fluorohydrocortisone acetate, melting point 203 to 210 degrees centigrade.

10. *6α - fluoro - 11β,17α,21-trihydroxy-4-pregnene-3,20-dione (6α-fluorohydrocortisone) (Compound XX)*

A solution of 1.1 grams of 6α-fluorohydrocortisone acetate, 1.0 grams of potassium bicarbonate, 100 milliliters of methanol, and fifteen milliliters of water was purged with nitrogen and stirred at approximately 25 degrees centigrade for several hours. The solution was then neutralized by addition of acetic acid and the methanol was removed by distillation under reduced pressure. The residue was extracted with 100 milliliters of methylene dichloride and the extract, after drying over sodium sulfate, was chromatographed over a column of eighty grams of synthetic magnesium silicate. The product fraction was eluted with Skellysolve B hexanes plus twenty and thirty percent acetone and gave 770 milligrams of 6α-fluorohydrocortisone, Compound XX, which melted at 192 to 195 degrees centigrade after crystallization from ethyl acetate-Skellysolve B hexanes. An analytical sample melted at 192 to 201 degrees centigrade and had a rotation of $[\alpha]_D$ plus 127 degrees (chloroform).

Analysis.—Calcd. for $C_{21}H_{29}O_5F$: C, 66.29; H, 7.68; F, 4.99. Found: C, 66.28; H, 7.65; F, 4.43.

EXAMPLE 22

*6α - fluoro - 11β - hydroxy-4-androstene-3,17-dione (Compound Iαe₁)*

A mixture of seven grams of Compound XX (obtained according to the procedure disclosed in Preparation A, above), 125 milliliters of glacial acetic acid and fifty milliliters of water is treated with thirty grams of analytical reagent sodium bismuthate and shaken vigorously at room temperature for approximately 45 minutes. While cooling the thus-obtained reaction mixture in an ice-bath, a solution of 120 grams of potassium hydroxide in 600 milliliters of water and 150 milliliters of methylene chloride is added thereto. After stirring for approximately thirty minutes 100 grams of diatomaceous earth filter aid is added, the mixture is filtered, and the cake washed well with methylene chloride. The filtrate and wash are combined and upon standing layer separation occurs. The organic layer is separated, washed with potassium hydroxide solution and water, and dried over sodium sulfate. Evaporation of the solvent gives a solid residue which is then recrystallized from methylene chloride-hexane to give 6α-fluoro-11β-hydroxy-4-androstene-3,17-dione, Compound Iαe₁, a crystalline solid product.

Compound Iαe₁ is then treated according to the procedure disclosed in Example 21, Parts C through F, to obtain in succession Compounds Iαf₁, Iαf₁(ester₂), Iαb₁(ester₂) and Iαb₁.

EXAMPLE 23

*6α-fluoro-4-androstene-3,11,17-trione (Compound Iαd₁)*

A solution of 150 milligrams of sodium dichromate dihydrate in five milliliters of acetic acid is added to 250 milligrams of 6α-fluoro-11β-hydroxy-4-androstene-3,17-dione, Compound Iαe₁, and the reaction mixture is stirred at approximately 25 degrees centigrade for about 45 minutes and then diluted with 100 milliliters of water, whereupon the product precipitates. The product is recovered by filtration, washed with water and dried. The product is recrystallized from ethyl acetate-Skellysolve C heptanes to give crystals of 6α-fluoro-4-androstene-3,11,17-trione, Compound Iαd₁.

EXAMPLE 24

*6α-fluoro-4-androstene-3,11,17-trione (Compound Iαd₁) from 6α-fluoro-11β,17α,21-trihydroxy-4-pregnene-3,20-dione (Compound XX)*

Compound XX is treated according to the procedure disclosed in Example 22 (first paragraph) to obtain Compound Iαe₁. Compound Iαe₁ is then treated according to the procedure disclosed in Example 23 to obtain 6α-fluoro-4-androstene-3,11,17-trione, Compound Iαd₁.

PREPARATION B

1. *19-nor-5-androstene-3,11,17-trione 3-17-bis-(ethylene ketal)*

A mixture of five grams of 19-nor-4-androstene-3,11,17-trione (U. S. Patent 2,757,186), 250 milliliters of benzene, twenty milliliters of ethylene glycol and 150 milligrams of p-toluenesulfonic acid is vigorously stirred and heated at reflux under a water trap until the reaction is complete. The reaction mixture is cooled, washed with five percent aqueous sodium carbonate solution and water and dried over sodium sulfate. Evaporation of the solvent gives a crude residue of 19-nor-5-androstene-3,11,17-trione 3,17-bis-(ethylene ketal).

2. *11β-hydroxy-19-nor-5-androstene-3,17-dione 3,17-bis-(ethylene ketal)*

The total crude residue obtained in Preparation B, Part 1, above, is dissolved in fifty milliliters of tetrahydrofuran and added with stirring over approximately a five minute period, under nitrogen, to a mixture of two grams of lithium aluminum hydride and 100 milliliters of anhydrous ether. The mixture is stirred whilst ice cooling, followed by careful treatment of the mixture with twenty milliliters of water. The mixture is then diluted with 200 milliliters of ether, stirred and filtered to remove inorganic solids. The filtrate is washed with three fifty-milliliters portions of water, dried over sodium sulfate, and the mixture taken to dryness. The residue is recrystallized from ether to give 11β-hydroxy-19-nor-5-androstene-3,17-dione 3,17-bis-(ethylene ketal), a crystalline solid.

3. *5α,6α-epoxy-11β-hydroxy-19-norandrostane-3,17-dione 3,17-bis-(ethylene ketal)*

A mixture of two grams of 11β-hydroxy-19-nor-5-androstene-3,17-dione 3,17-bis-(ethylene ketal), forty milliliters of chloroform and 0.4 gram of sodium acetate is cooled in an ice-water bath and treated with four milliliters of forty percent peracetic acid. The cooled mixture is stirred vigorously for several hours. The cold bath is then removed and the mixture is stirred with forty milliliters of saturated aqueous sodium bicarbonate solution for one hour and upon being allowed to stand layer separation occurs. The chloroform layer is separated, washed twice with water, dried over sodium sulfate and the solvent removed by distillation. The residue is recrystallized from ether to give 5α, 6α-expoxy-11β-hydroxy-19-norandrostane-3,17-dione 3,17-bis-(ethylene ketal), Compound XVIII₂, a crystalline solid.

EXAMPLE 25

A. *6β-fluoro-5α,11β-dihydroxy-19-norandrostane-3,17-dione (Compound XIX₂)*

A stoichiometric equivalent amount of Compound XVIII₂, obtained according to the procedure of Preparation B, Parts 1 through 3, above, is substituted for Compound XVIII₁ in the procedure of Example 21, Part A, to obtain a crude residue of 6β-fluoro-5α,11β-dihydroxy-19-norandrostane-3,17-dione, Compound XIX₂.

B. *6α-fluoro-11β-hydroxy-19-nor-4-androstene-3,17-dione (Compound Iαe₂)*

The crude residue of Compound XIX₂ is substituted for the crude residue of Compound XIX₁ in the procedure of Example 21, Part B, to obtain crystals of 6α-fluoro-11β-hydroxy-19-nor-4-androstene-3,17-dione, Compound Iαe₂.

C. *6α-fluoro-11β,17β-dihydroxy-19-nor-4-androsten-3-one (Compound Iαf₂)*

A stoichiometric equivalent amount of Compound Iαe₂ is substituted for Compound $I\alpha e_1$ in the procedure of Example 21, Part C, to obtain crystals of $6\alpha$-fluoro-$11\beta,17\beta$-dihydroxy-19-nor-4-androsten-3-one, Compound $I\alpha f_2$.

D. *$6\alpha$-fluoro-$11\beta,17\beta$-dihydroxy-19-nor-4-androsten-3-one 17-acetate* [Compound $I\alpha f_2(ester_2)$]

A stoichiometric equivalent amount of Compound $I\alpha f_2$ is substituted for Compound $I\alpha f_1$ in the procedure of Example 21, Part D, to obtain $6\alpha$-fluoro-$11\beta,17\beta$-dihydroxy-19-nor-4-androsten - 3 - one 17-acetate, Compound $I\alpha f_2$-(ester$_2$).

Similarly by reacting Compound $I\alpha f_2$ with the appropriate hydrocarbon carboxylic acids (in the presence of an esterification catalyst), or the acid anhydrides and acid halides thereof, such as those named above, there are produced other 17-acylates of $6\alpha$-fluoro-$11\beta,17\beta$-dihydroxy-19-nor-4-androsten-3-one such as, for example, the 17-propionate, the 17-hemisuccinate, and the 17-benzoate.

E. *$6\alpha$-fluoro-$17\beta$-hydroxy-19-nor-4-androstene-3,11-dione 17-acetate* [Compound $I\alpha b_2(ester_2)$]

A stoichiometric equivalent amount of Compound $I\alpha f_2$-(ester$_2$) is substituted for Compound $I\alpha f_1$(ester$_2$) in the procedure of Example 21, Part E, to obtain crystals of $6\alpha$-fluoro-$17\beta$-hydroxy-19-nor-4-androstene-3,11-dione 17-acetate, Compound $I\alpha b_2$(ester$_2$).

F. *$6\alpha$-fluoro-$17\beta$-hydroxy-19-nor-4-androstene-3,11-dione* (Compound $I\alpha b_2$)

A stoichiometric equivalent amount of Compound $I\alpha b_2$(ester$_2$) is substituted for Compound $I\alpha b_1$(ester$_2$) in the procedure of Example 21, Part F, to obtain $6\alpha$-fluoro-$17\beta$-hydroxy-19-nor-4-androstene-3,11-dione, Compound $I\alpha b_2$.

EXAMPLE 26
*$6\alpha$-fluoro-19-nor-4-androstene-3,11,17-trione* (Compound $I\alpha d_2$)

A stoichiometric equivalent amount of Compound $I\alpha e_2$ is substituted for Compound $I\alpha e_1$ in the procedure of Example 23 to obtain crystalline $6\alpha$-fluoro-19-nor-4-androstene-3,11,17-trione, Compound $I\alpha d_2$.

It is to be understood that the invention is not to be limited to the exact details of operation and exact compounds shown and described, as obvious modifications and equivalents will be apparent to one skilled in the art, and the invention is therefore to be limited only by the scope of the appended claims.

We claim:
1. A 6-fluoro compound of the androstane series having the formula:

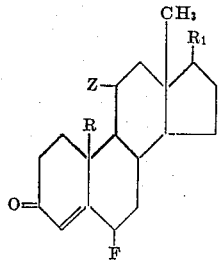

wherein R is selected from the group consisting of methyl and hydrogen, $R_1$ is selected from the group consisting of hydroxyl, OAcyl, and keto, the term Acyl representing the acyl radical of a hydrocarbon carboxylic acid containing from one to twelve carbon atoms, inclusive, and Z is selected from the group consisting of hydrogen, hydroxyl, and keto.

2. 6-fluoro-$17\beta$-hydroxy-4-androsten-3-one.
3. $6\alpha$-fluoro-$17\beta$-hydroxy-4-androsten-3-one.
4. $6\beta$-fluoro-$17\beta$-hydroxy-4-androsten-3-one.
5. 6-fluoro-4-androstene-3,17-dione.
6. $6\alpha$-fluoro-4-androstene-3,17-dione.
7. $6\beta$-fluoro-4-androstene-3,17-dione.
8. 6-fluoro-$17\beta$-hydroxy-4-androstene-3,11-dione.
9. $6\alpha$-fluoro-$17\beta$-hydroxy-4-androstene-3,11-dione.
10. $6\beta$-fluoro-$17\beta$-hydroxy-4-androstene-3,11-dione.
11. 6-fluoro-4-androstene-3,11,17-trione.
12. $6\alpha$-fluoro-4-androstene-3,11,17-trione.
13. $6\beta$-fluoro-4-androstene-3,11,17-trione.
14. $6\alpha$-fluoro-$11\beta$-hydroxy-4-androstene-3,17-dione.
15. $6\alpha$-fluoro-$11\beta,17\beta$-dihydroxy-4-androsten-3-one.
16. 6-fluoro-$17\beta$-hydroxy-4-androsten-3-one 17-acylate in which the acyl radical is that of a hydrocarbon carboxylic acid containing from one to twelve carbon atoms, inclusive.
17. $6\alpha$-fluoro-$17\beta$-hydroxy-4-androsten-3-one 17-propionate.
18. $6\beta$-fluoro-$17\beta$-hydroxy-4-androsten-3-one 17-propionate.
19. $6\alpha$-fluoro-$11\beta,17\beta$-dihydroxy-4-androsten-3-one 17-acylate in which the acyl radical is that of a hydrocarbon carboxylic acid containing from one to twelve carbon atoms, inclusive.
20. $6\alpha$-fluoro-$11\beta,17\beta$-dihydroxy-4-androsten-3-one 17-propionate.
21. 6-fluoro-$17\beta$-hydroxy-4-androstene-3,11-dione 17-acylate in which the acyl radical is that of a hydrocarbon carboxylic acid containing from one to twelve carbon atoms, inclusive.
22. $6\alpha$-fluoro-$17\beta$-hydroxy-4-androstene-3,11-dione 17-propionate.
23. $6\beta$-fluoro-$17\beta$-hydroxy-4-androstene-3,11-dione 17-propionate.
24. A 6-fluoro-5-hydroxy compound of the androstane series having the formula:

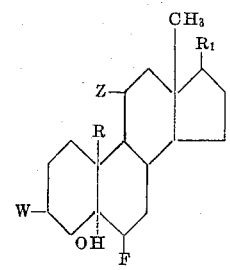

wherein R is selected from the group consisting of methyl and hydrogen, $R_1$ is selected from the group consisting of hydroxyl, OAcyl and keto, the term Acyl representing an acyl radical of a hydrocarbon carboxylic acid containing from one to twelve carbon atoms, inclusive, W is selected from the group consisting of hydroxyl and keto, and Z is selected from the group consisting of hydrogen, hydroxyl and keto.

25. $6\beta$-fluoro-$5\alpha,17\beta$-dihydroxyandrostan-3-one.
26. $6\beta$-fluoro-$5\alpha,17\beta$-dihydroxyandrostan-3-one 17-propionate.
27. $6\beta$-fluoro-$5\alpha,17\beta$-dihydroxyandrostane-3,11-dione.
28. $6\beta$ - fluoro-$5\alpha,17\beta$-dihydroxyandrostane-3,11-dione 17-propionate.
29. $6\beta$-fluoro-$5\alpha$-hydroxyandrostane-3,17-dione.
30. $6\beta$-fluoro-$5\alpha$-hydroxyandrostane-3,11,17-trione.
31. $6\beta$-fluoro-$3\beta,5\alpha,17\beta$-trihydroxyandrostane.
32. $6\beta$-fluoro-$5\alpha,11\beta$-dihydroxyandrostane-3,17-dione.
33. A 6-fluoro-11-oxygenated compound of the androstane series having the formula:

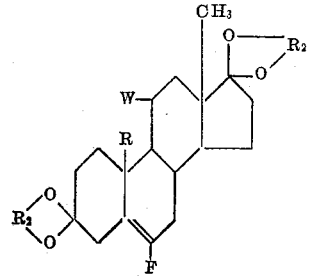

wherein R is selected from the group consisting of hydrogen and methyl, $R_2$ is an alkylene radical containing not more than eight carbon atoms, inclusive, and the attaching oxygen to carbon bonds are separated by a chain of at least two and not more than three carbon atoms and W is selected from the group consisting of hydroxyl and keto.

34. 6-fluoro-5-androstene-3,11,17-trione 3,17-bis-(ethylene ketal).

35. 6-fluoro-11β-hydroxy-5-androstene-3,17-dione 3,17-bis-(ethylene ketal).

36. A 6-fluoro-11-oxygenated compound of the androstane series having the formula:

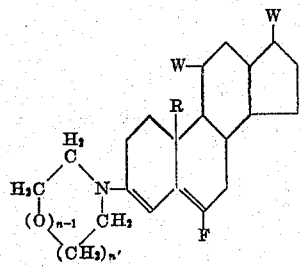

wherein R is selected from the group consisting of methyl and hydrogen, and where W is the same member selected from the group consisting of hydroxyl and keto and $n$ and $n'$ are whole numbers from one to two, inclusive.

37. 3-(N-pyrrolidinyl)-6-fluoro-3,5-androstadiene - 11,17-dione.

38. 3-(N-pyrrolidinyl)-6-fluoro-11β,17β-dihydroxy - 3,5-androstadiene.

No references cited.

UNITED STATES PATENT OFFICE

Certificate of Correction

Patent No. 2,838,492

June 10, 1958

Raymond L. Pederson et al.

It is hereby certified that error appears in the printed specification of the above numbered patent requiring correction and that the said Letters Patent should read as corrected below.

Column 2, lines 26 to 36, Formula IIA, should appear as shown below instead of as in the patent:

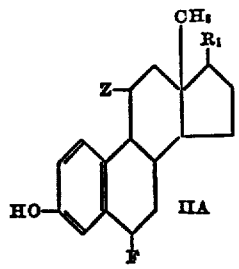

column 7, Formula XVI, should appear as shown below instead of as in the patent:

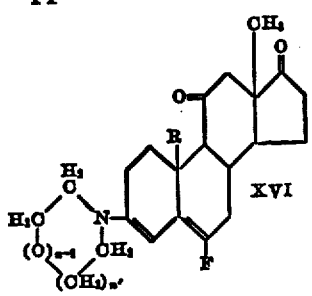

same column 7, Formula XVII, should appear as shown below instead of as in the patent:

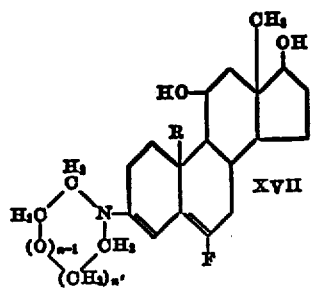

column 9, line 20, for "integrer" read —integer—; column 13, Formula I$\alpha f$(ester), should appear as shown below instead of as in the patent:

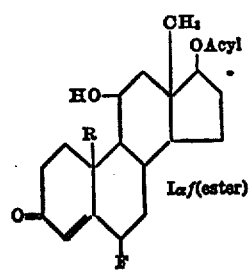

column 23, line 64, for "elevent" read —eleven—; column 24, line 70, for "VIIa₂" read —VIIIa₂—; column 25, line 18, for "Iβa₂" read —Iβc₂—; line 49, for "Iβa₂" read —Iβd₂—; column 28, line 11, for "10-nor-3,5-androstadiene" read —19-nor-3,5-androstadiene—; line 70, for "fifty-milliliters" read —fifty-milliliter—; column 32, line 19, for "(9.-milliliters" read —(9.1 milliliters—; line 32, for "metling" read —melting—; column 34, line 31, for "fifty-milliliters" read —fifty-milliliter—.

Signed and sealed this 7th day of April 1959.

[SEAL]

Attest:
KARL H. AXLINE,
*Attesting Officer.*

ROBERT C. WATSON,
*Commissioner of Patents.*

Disclaimer 2,838,492.—*Raymond L. Pederson* and *Milton E. Herr*, Kalamazoo, *John C. Babcock*, Portage Township, Kalamazoo County, and *J Allan Campbell* and *John A. Hogg*, Kalamazoo, Mich. 6-FLUORO STEROIDS. Patent dated June 10, 1958. Disclaimer filed May 20, 1965, by the inventors; the assignee, *The Upjohn Company*, assenting.

Hereby enter this disclaimer to claims 2, 3, 4, 5, 6 and 7 of said patent.
[*Official Gazette August 24, 1965.*]